(12) United States Patent
Bartolomé Rodrigo

(10) Patent No.: US 12,245,116 B2
(45) Date of Patent: Mar. 4, 2025

(54) METHODS AND APPARATUSES FOR HANDLING SLICE SELECTION DATA FOR A USER

(71) Applicant: Telefonaktiebolaget LM Ericsson (publ), Stockholm (SE)

(72) Inventor: Maria Cruz Bartolomé Rodrigo, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1013 days.

(21) Appl. No.: 17/057,520

(22) PCT Filed: Jul. 20, 2018

(86) PCT No.: PCT/EP2018/069756
§ 371 (c)(1),
(2) Date: Nov. 20, 2020

(87) PCT Pub. No.: WO2019/223888
PCT Pub. Date: Nov. 28, 2019

(65) Prior Publication Data
US 2021/0204103 A1 Jul. 1, 2021

(30) Foreign Application Priority Data
May 21, 2018 (EP) ..................... 18382348

(51) Int. Cl.
*H04W 8/18* (2009.01)
*H04L 9/40* (2022.01)
(Continued)

(52) U.S. Cl.
CPC .......... *H04W 4/50* (2018.02); *H04L 61/4511* (2022.05); *H04L 63/0428* (2013.01); *H04W 8/08* (2013.01);
(Continued)

(58) Field of Classification Search
CPC .......... H04W 4/50; H04W 8/08; H04W 8/18; H04W 8/186; H04W 8/20; H04L 61/4511; H04L 63/0428
See application file for complete search history.

(56) References Cited

U.S. PATENT DOCUMENTS

2018/0255421 A1* 9/2018 Hua .................. H04W 4/14
2019/0029065 A1* 1/2019 Park .................. H04W 8/08
(Continued)

FOREIGN PATENT DOCUMENTS

| CN | 107005792 A | 8/2017 |
|---|---|---|
| CN | 107646197 A | 1/2018 |
| WO | 2018086622 A1 | 5/2018 |

OTHER PUBLICATIONS

3rd Generation Partnership Project; Technical Specification Group Services and System Aspect; System Architecture for the 5G system; Stage 3 (release 15), 3GPP TS 23.501 V15.1.0 (Mar. 2018).*

(Continued)

*Primary Examiner* — Dai Phuong
(74) *Attorney, Agent, or Firm* — Rothwell, Figg, Ernst & Manbeck, P.C.

(57) ABSTRACT

There is provided a method for accessing data in a UDR. The method comprises storing, for a Data Set provided in a UDR a plurality of SBA services. The method also comprises registering, from the UDR toward an NRF identifiers for the plurality of SBA services handled at the UDR and an identifier of the UDR, receiving, at the NRF from an NF service consumer, a service discovery request with an identifier of an SBA service, and transmitting, from the NRF toward the NF service consumer, the identifier of the UDR handling the SBA service. The method also comprises transmitting, from the NF service consumer toward the UDR identified by the identifier of the UDR, a service request for (Continued)

the SBA service, and receiving, at the NF service consumer from the UDR, information data relating to the one or more Data Subsets associated with the SBA service.

16 Claims, 17 Drawing Sheets

(51) Int. Cl.
  *H04L 61/4511*  (2022.01)
  *H04W 4/50*  (2018.01)
  *H04W 8/08*  (2009.01)
  *H04W 8/20*  (2009.01)

(52) U.S. Cl.
  CPC ............. *H04W 8/18* (2013.01); *H04W 8/186* (2013.01); *H04W 8/20* (2013.01)

(56) References Cited

U.S. PATENT DOCUMENTS

| | | | | |
|---|---|---|---|---|
| 2019/0124609 | A1* | 4/2019 | Gheorghiu | H04W 28/20 |
| 2021/0258769 | A1* | 8/2021 | Kim | H04W 8/14 |
| 2022/0166626 | A1* | 5/2022 | Madisetti | H04L 67/10 |

OTHER PUBLICATIONS

International Search Report and the Written Opinion of the International Searching Authority, issued in corresponding International Application No. PCT/EP2018/069756, dated Jan. 24, 2019, 11 pages.

3GPP TS 23.501 V15.1.0 (Mar. 2018), 3rd Generation Partnership Project; Technical Specification Group Services and System Aspects; System Architecture for the 5G System; Stage 2 (Release 15), Mar. 2018, 201 pages.

3GPP TS 23.502 V15.1.0 (Mar. 2018), 3rd Generation Partnership Project; Technical Specification Group Services and System Aspects; Procedures for the 5G System; Stage 2 (Release 15), Mar. 2018, 285 pages.

3GPP TR 23.742 V0.0.0 (Apr. 2018), 3rd Generation Partnership Project; Technical Specification Group Services and System Aspects; Study on Enhancements to the Service-Based Architecture (Release 16), Apr. 2018, 7 pages.

3GPP 3rd Generation Partnership Project; Technical Specification Group Core Network and Terminals' 5G Sysem—Phase 1; CT WG4 Aspects (Release 15), 3GPP TR 29.891 V15.0.0 (Dec. 2017), 146 pages.

* cited by examiner

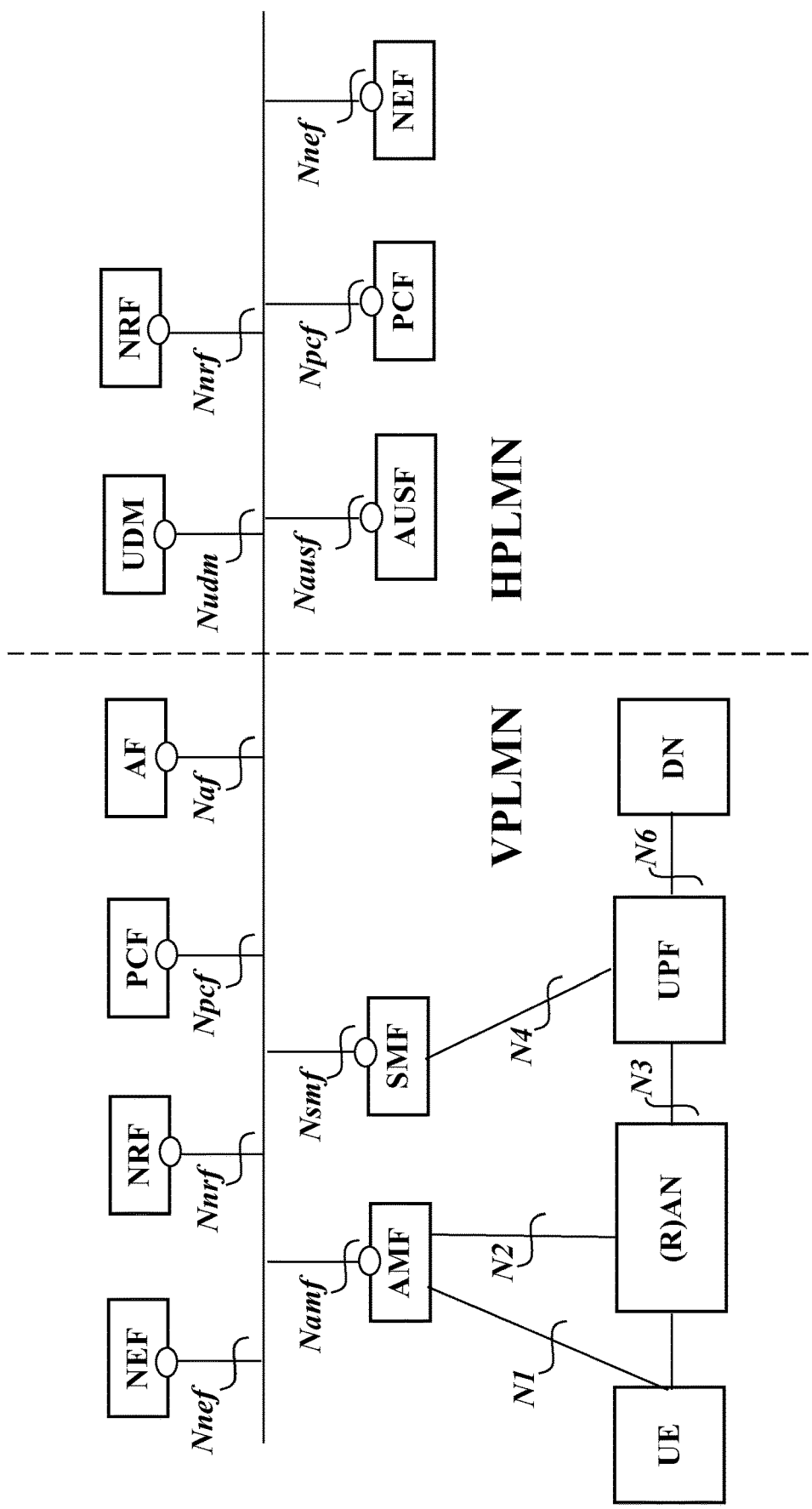
FIG. -1-

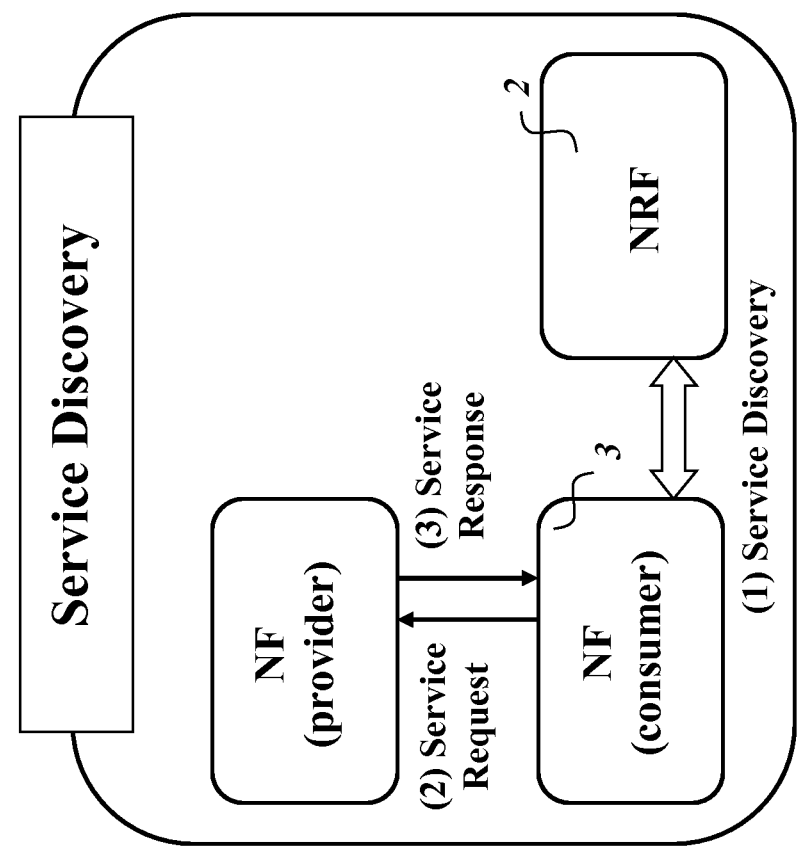
FIG. -3-
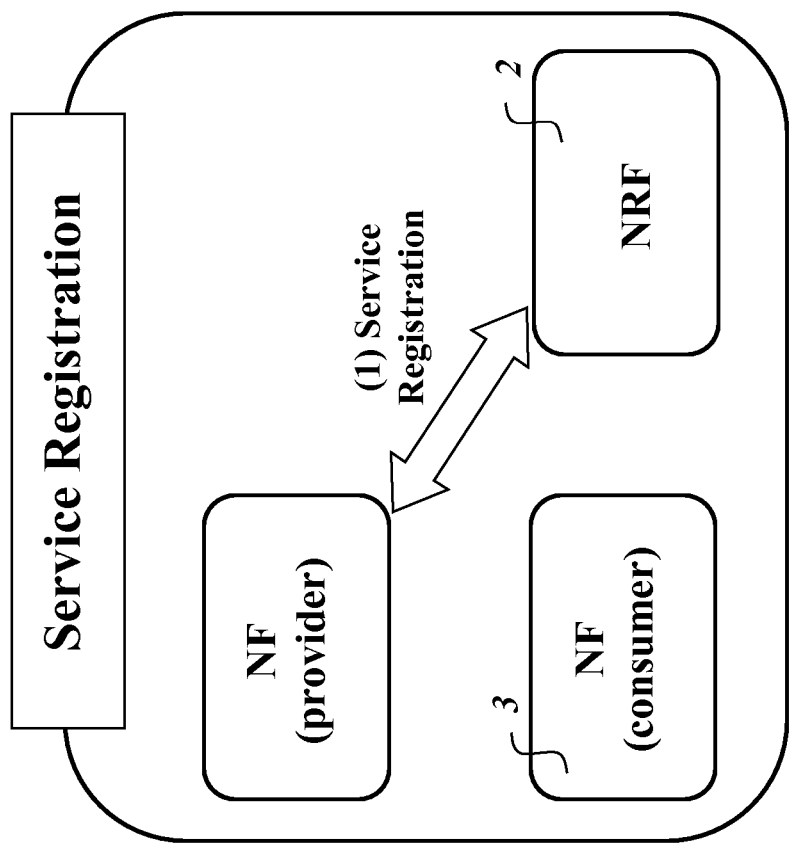
FIG. -2-

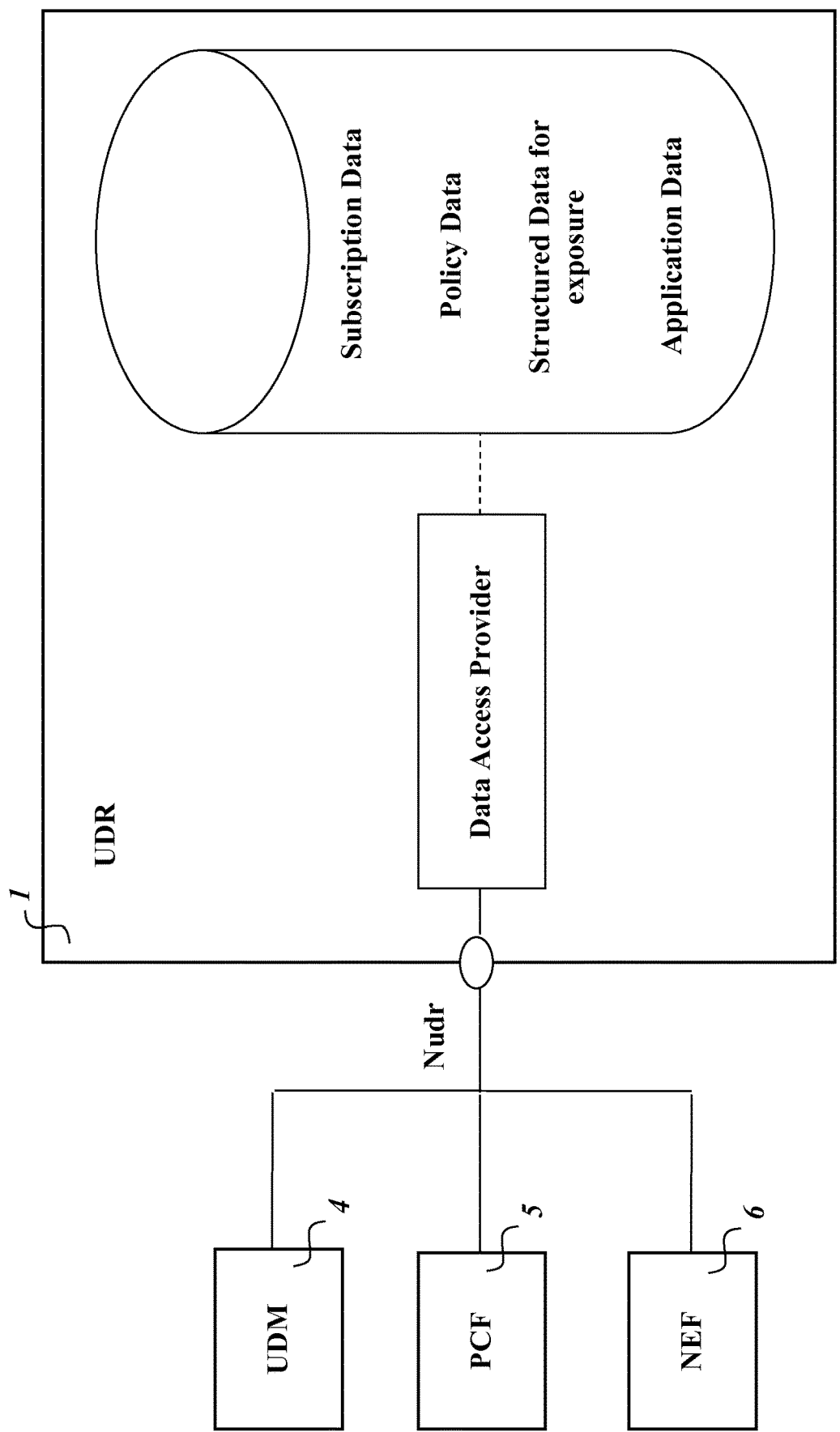
FIG. -4-

| NF service | Service Operations | Operation Semantics | Example Consumer(s) |
|---|---|---|---|
| Data Management (DM) | Query | Request/Response | UDM, PCF, NEF (PFDF) |
| | Create | Request/Response | NEF (PFDF) |
| | Delete | Request/Response | NEF (PFDF) |
| | Update | Request/Response | UDM, PCF, NEF (PFDF) |
| | Subscribe | Subscribe/Notify | UDM, PCF, NEF (PFDF) |
| | Unsubscribe | | UDM, PCF, NEF (PFDF) |
| | Notify | | UDM, PCF, NEF (PFDF) |

FIG. -5-

| Data Set | Data Subset | Data Key | Data Sub Key |
|---|---|---|---|
| Subscription Data (see clause 5.2.3.3.1) | Access and Mobility Subscription data | SUPI | - |
| | SMF Selection Subscription data | SUPI | - |
| | UE context in SMF data | SUPI | S-NSSAI |
| | | | DNN |
| | SMS Management Subscription data | SUPI | - |
| | SMS Subscription data | SUPI | S-NSSAI |
| | Session Management Subscription data | SUPI | DNN |
| | Slice Selection Subscription data | SUPI | - |

FIG. -6-

| Service | Service Operations | Operation Semantics | Example Consumer(s) |
|---|---|---|---|
| AccessMobilitySubsData | Query | Request/Response | UDM |
| | Update | Request/Response | UDM |
| | Subscribe | Subscribe/Notify | UDM |
| | Unsubscribe | Subscribe/Notify | UDM |
| | Notify | Subscribe/Notify | UDM |
| SessionSubsData | Query | Request/Response | UDM |
| | Update | Request/Response | UDM |
| | Subscribe | Subscribe/Notify | UDM |
| | Unsubscribe | Subscribe/Notify | UDM |
| | Notify | Subscribe/Notify | UDM |
| SMSSubsData | Query | Request/Response | UDM |
| | Update | Request/Response | UDM |
| | Subscribe | Subscribe/Notify | UDM |
| | Unsubscribe | Subscribe/Notify | UDM |
| | Notify | Subscribe/Notify | UDM |

*FIG. -7-*

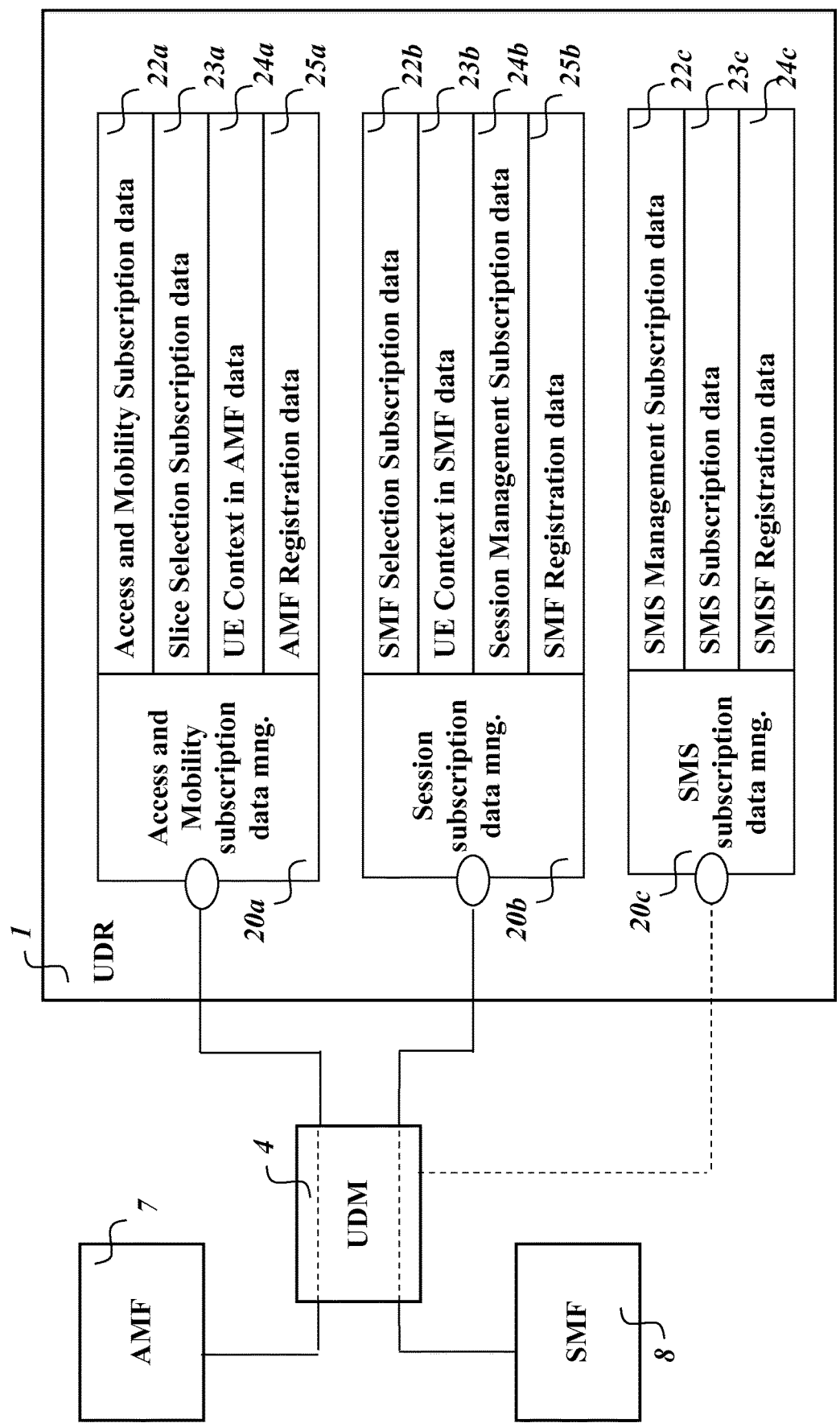
FIG.-8-

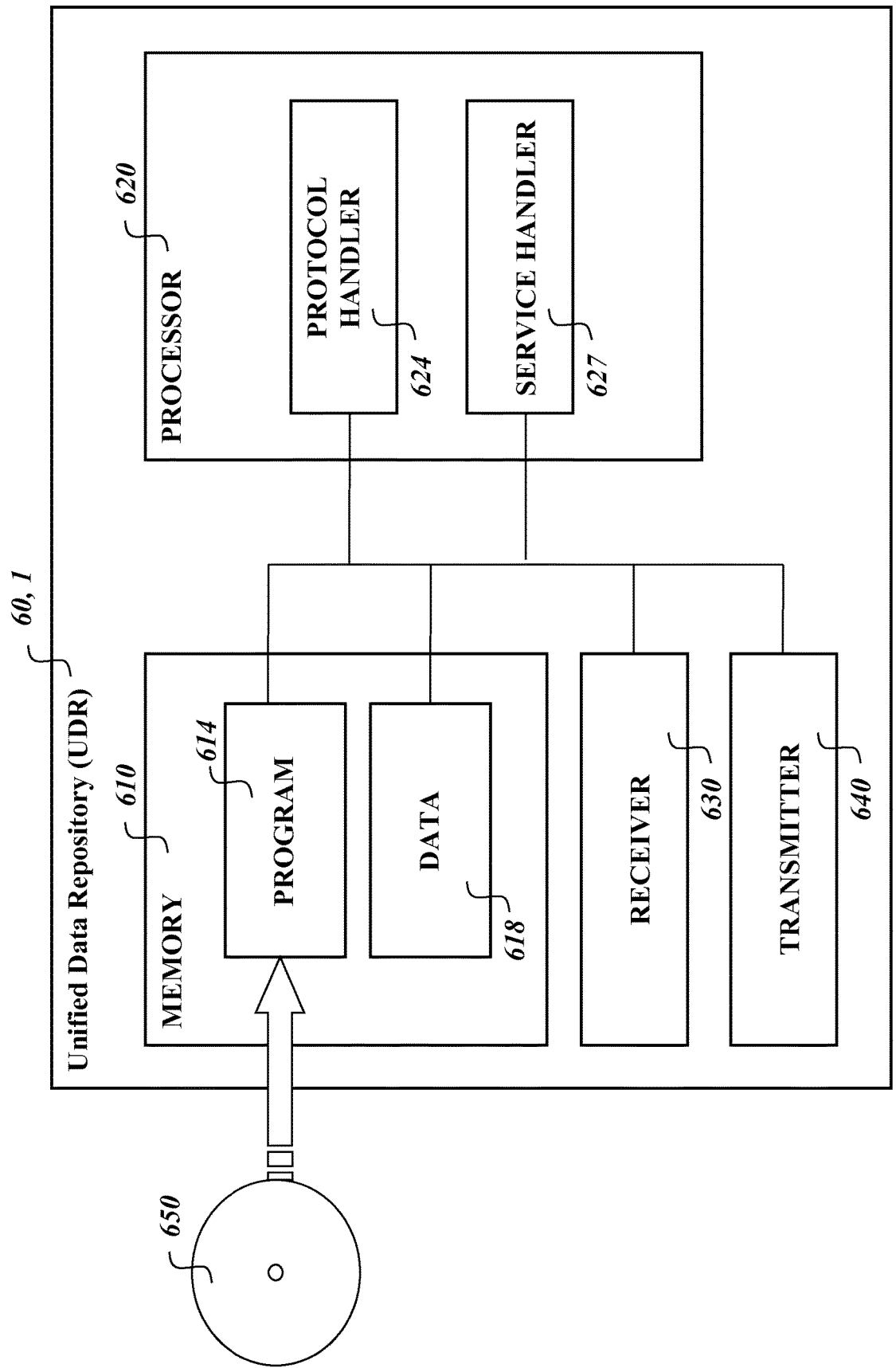
FIG. -9-

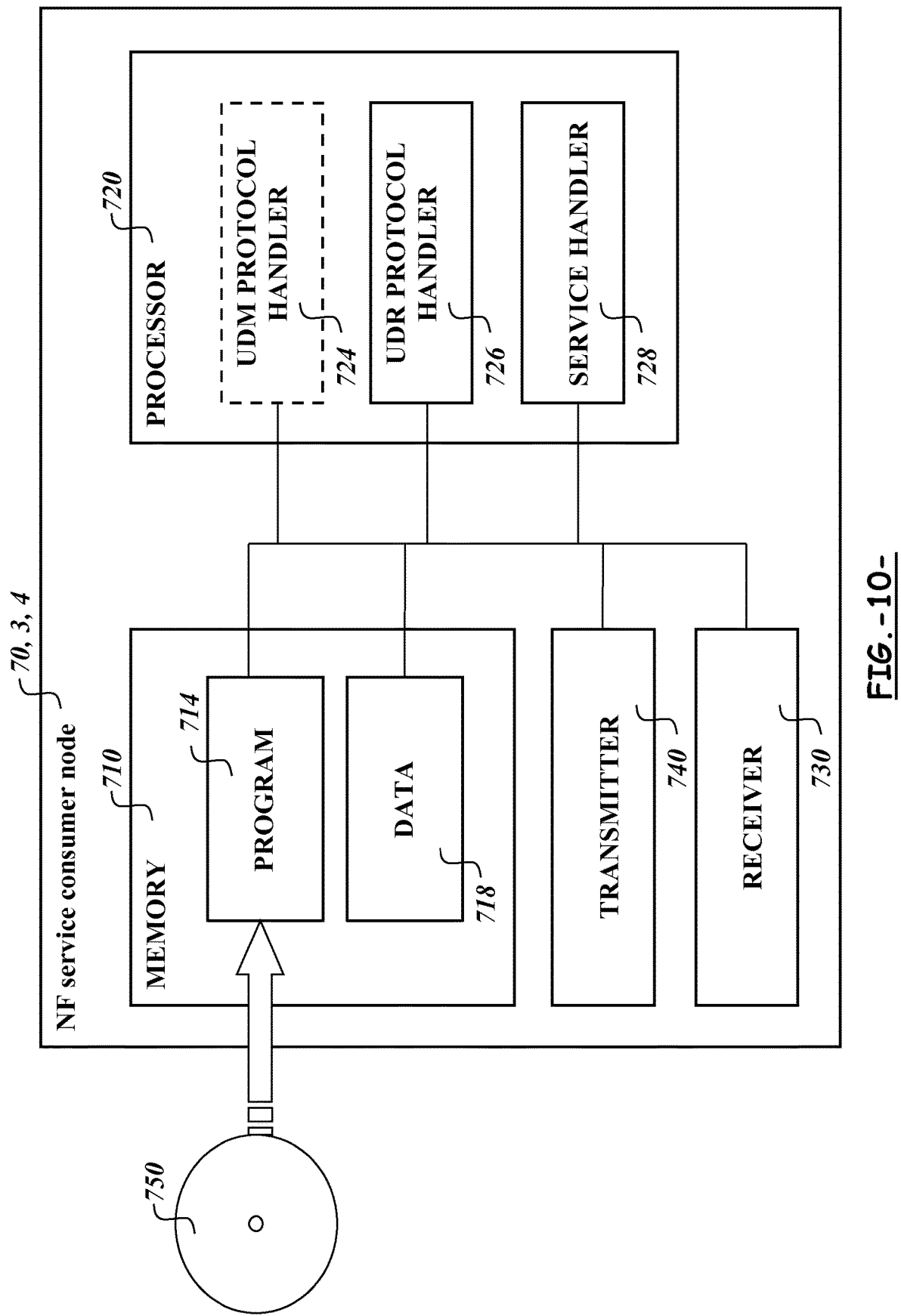
FIG. -10-

S-1110 — Splitting a Data Set, which is provided in the UDR for a plurality of Network Function, NF, service consumers, into a plurality of Service Based Architecture, SBA, services, wherein each SBA service is associated with one or more Data Subsets, amongst a plurality of Data Subsets associated with the Data Set, and wherein each SBA service is provided for one or more NF service consumer amongst the plurality of NF service consumers S-1120 — Registering, toward a Network Repository Function, NRF, identifiers for the plurality of SBA services handled at the UDR and an identifier of the UDR S-1130 — Receiving, from an NF service consumer, a service request for an SBA service S-1140 — Transmitting, toward the NF service consumer, information data relating to the one or more Data Subsets associated with the SBA service

FIG. -11-

Storing, for a Data Set provided in the UDR for a plurality of Network Function, NF, service consumers, a plurality of Service Based Architecture, SBA, services, wherein each SBA service is associated with one or more Data Subsets, amongst a plurality of Data Subsets associated with the Data Set, and wherein each SBA service is provided for one or more NF service consumer amongst the plurality of NF service consumers

S-1210

Registering, toward a Network Repository Function, NRF, identifiers for the plurality of SBA services handled at the UDR and an identifier of the UDR

S-1220

Receiving, from an NF service consumer, a service request for an SBA service

S-1230

Transmitting, toward the NF service consumer, information data relating to the one or more Data Subsets associated with the SBA service

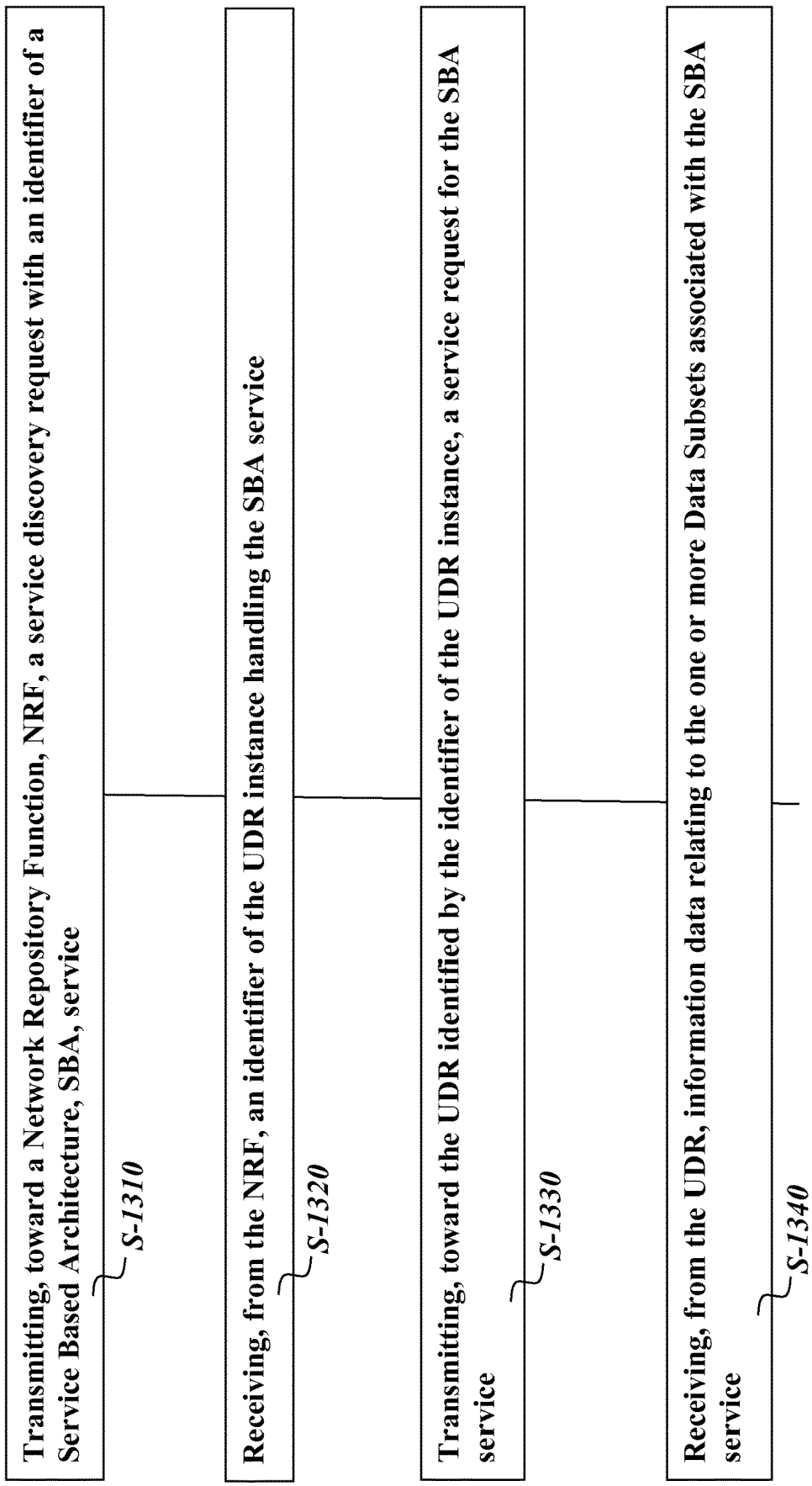
FIG. -13-

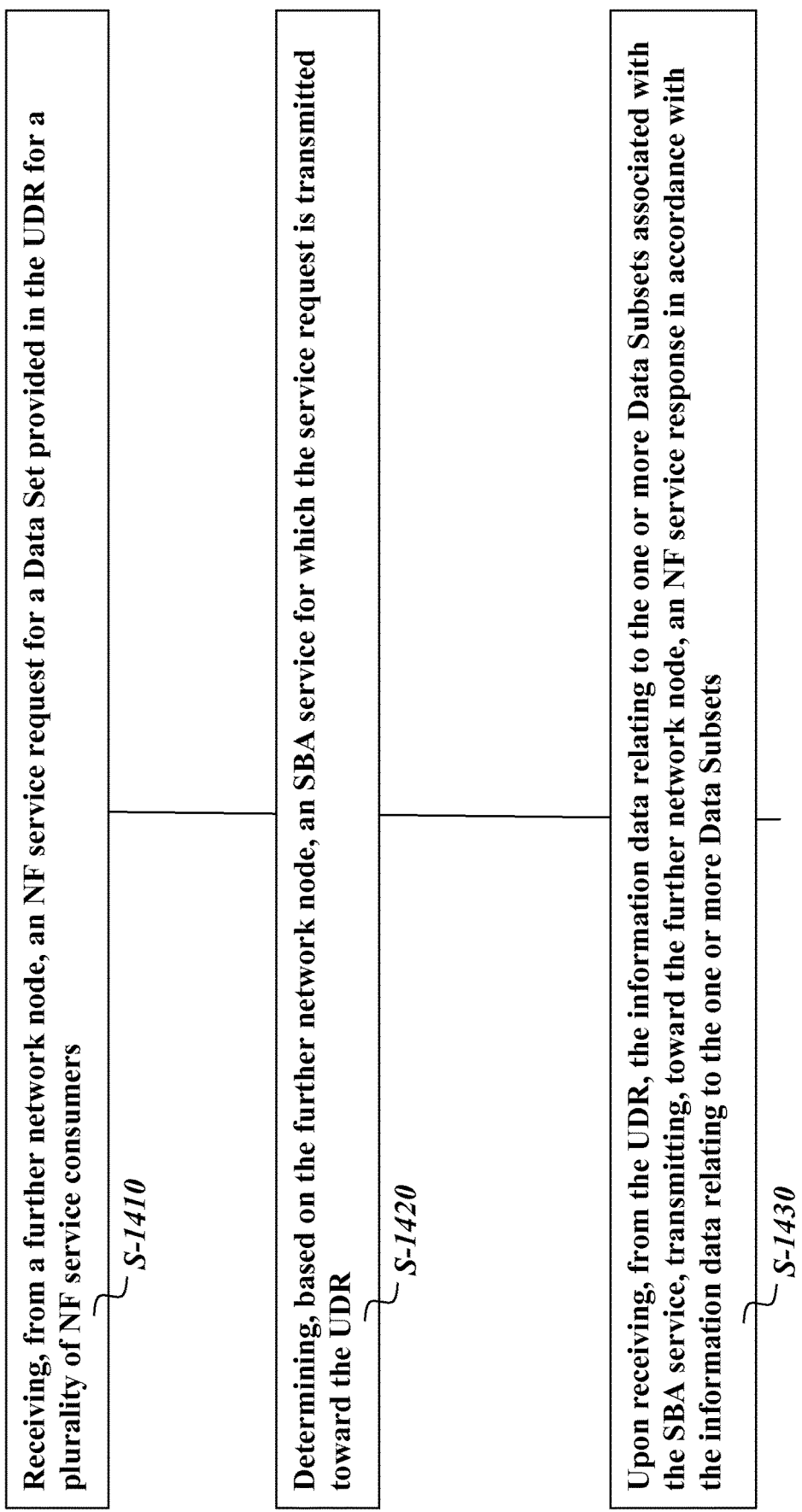
FIG. -14-

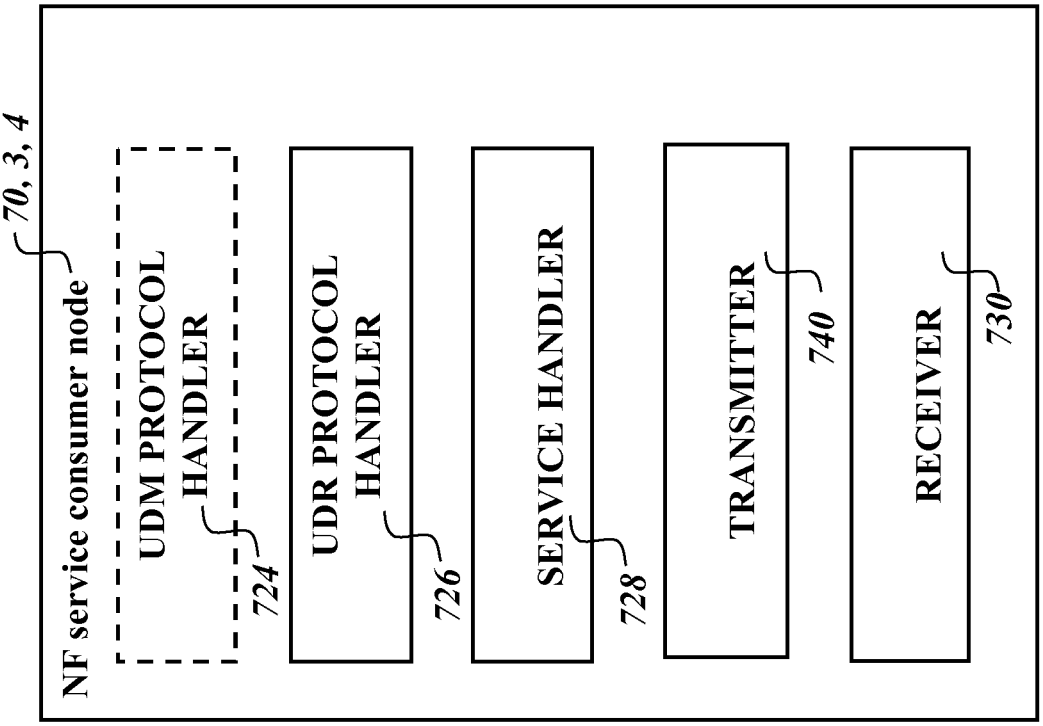
FIG. -16-
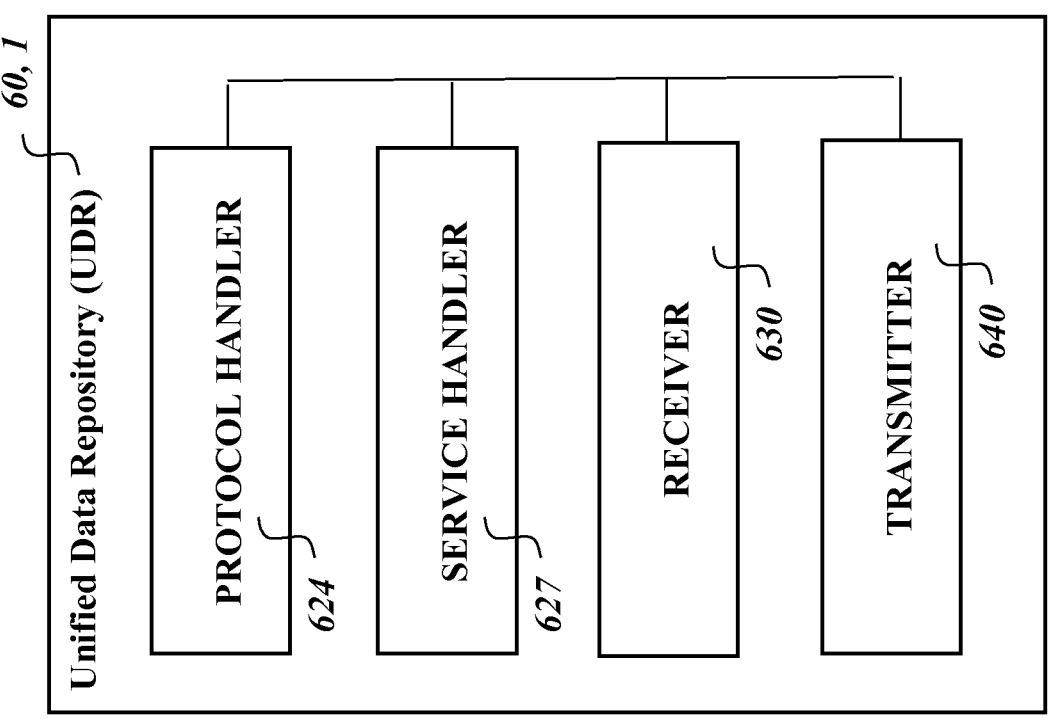
FIG. -15-

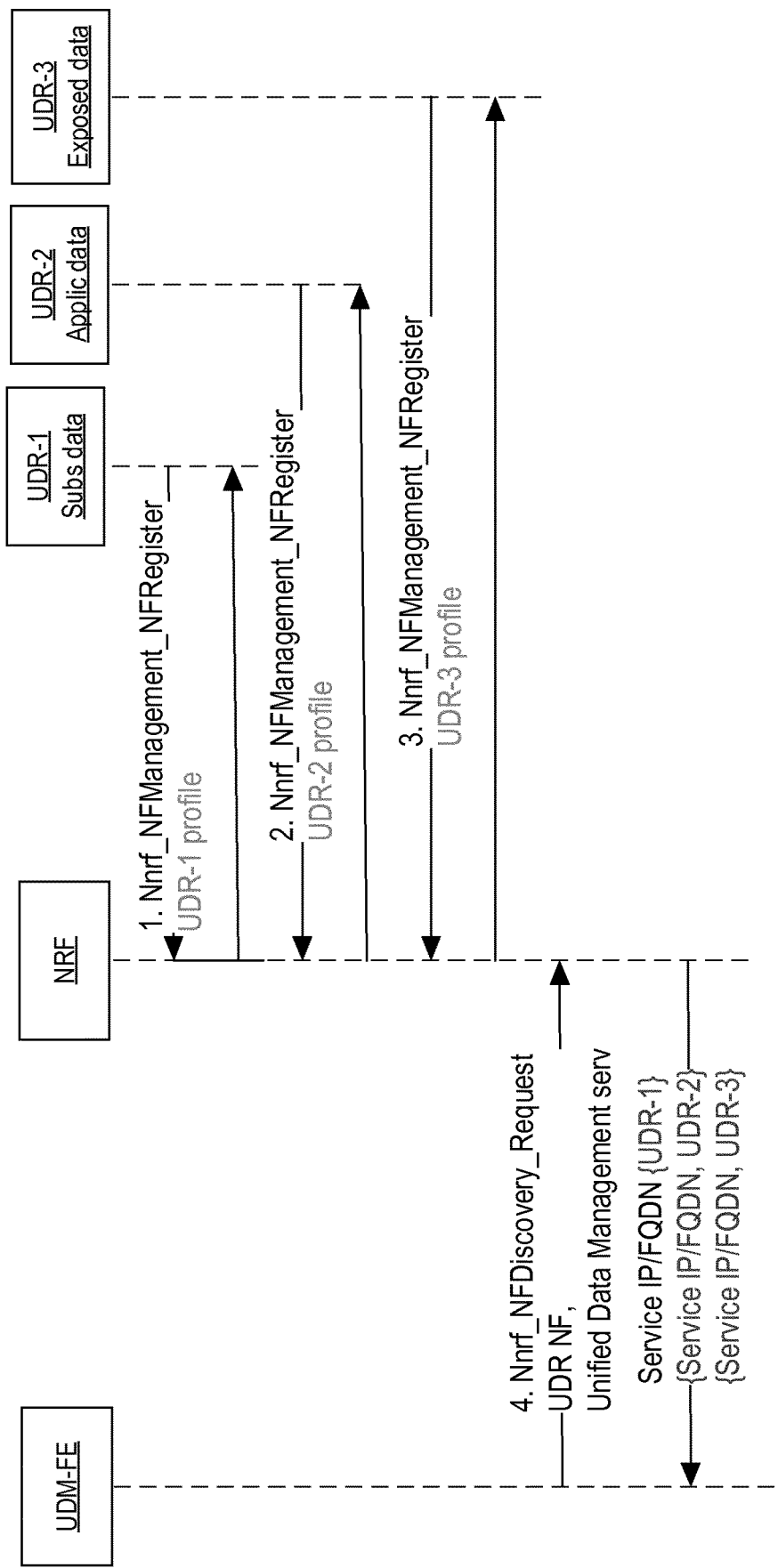
FIG. -17-

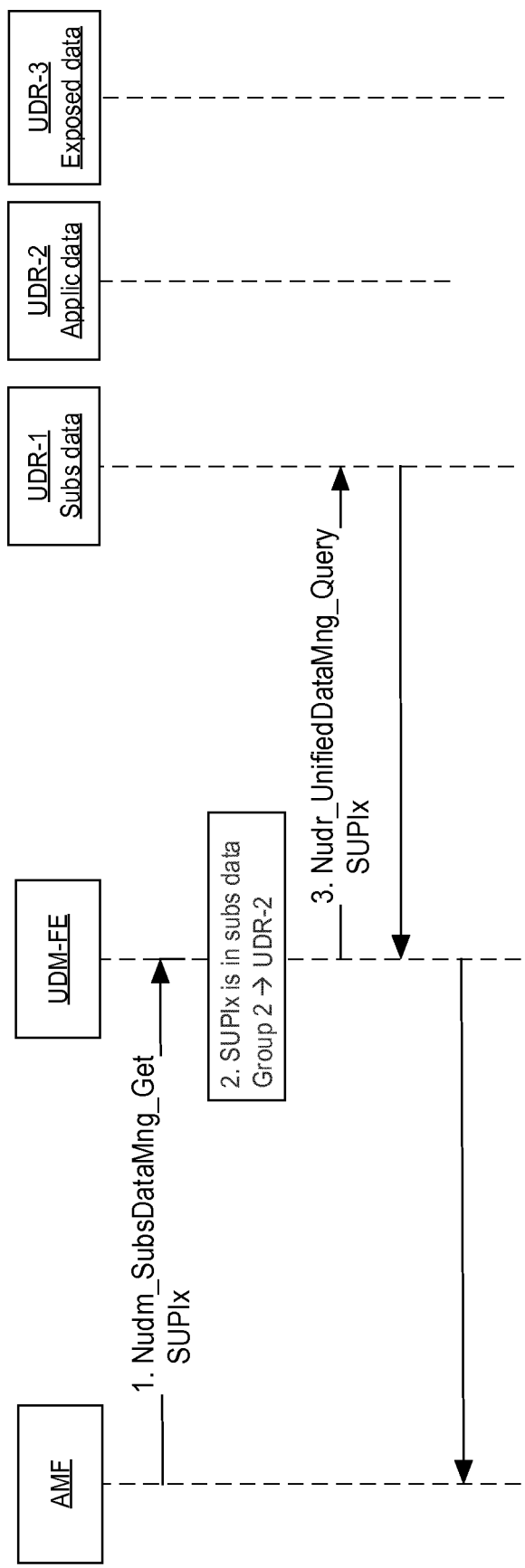
FIG. -18-

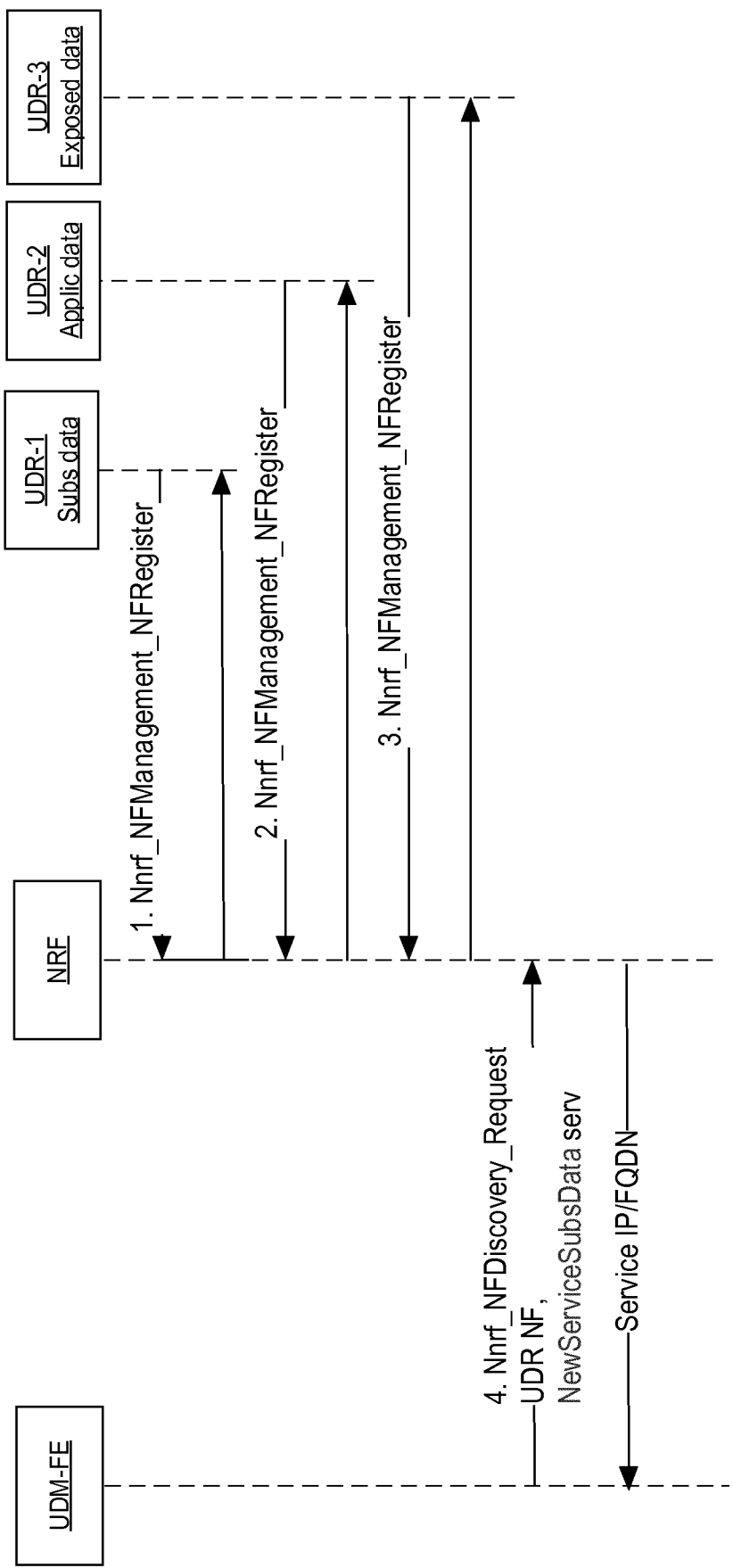
FIG. -19-

METHODS AND APPARATUSES FOR HANDLING SLICE SELECTION DATA FOR A USER

CROSS REFERENCE TO RELATED APPLICATION(S)

This application is a 35 U.S.C. § 371 National Phase Entry Application from PCT/EP2018/069756, filed Jul. 20, 2018, designating the United States, and also claims the benefit of European Application No. 18382348.3, filed May 21, 2018, the disclosures of which are incorporated herein by reference in their entirety.

TECHNICAL FIELD

The present invention generally relates to handling of services in a 5G network; and, more specifically, the invention relates to introduction of a Service Based Architecture.

BACKGROUND

3GPP TS 23.501 v15.1.0 defines a Network Function (NF) as a 3GPP adopted or 3GPP defined processing function in a 5G network, which has defined functional behaviour and 3GPP defined interfaces. An NF can be implemented either as a network element on a dedicated hardware, or as a software instance running on a dedicated hardware. For example, FIG. 1 shows a Roaming 5G System architecture-local breakout scenario with an Application Function (AF) in VPLMN in a service-based interface representation, as disclosed in 3GPP TS 23.501.

5G includes a disruptive change, i.e. traditional peer-to-peer interfaces and protocols are modified by a so-called Service Based Architecture (SBA), wherein each NF (as an NF producer or NF provider) may provide one or more services to one or more NF consumers by means of HTTP/REST. An NF producer communicates with an NF consumer via a specific reference point. An NF service is one type of capability exposed by an NF (NF Service Producer or NF Service Provider) to other authorized NF (NF Service Consumer) through a service-based interface (SBI) or reference point.

A service producer is instantiated to be used by a service consumer instance. Service instances are defined when the system is set up, but the number of instances is dynamic: scaling up/down, failures, programmed maintenance, etc. The NF discovery and NF service discovery enable one NF to discover a set of NF instance with specific NF service or a target NF type. The NF Repository Function (NRF) supports the NF discovery and NF service discovery.

To this end, as at least partially illustrated in FIG. 2 and FIG. 3, the NRF receives registration and deregistration from an NF service producer, allows discovery and selection of available NF service producers by an NF service consumer, and authorizes an NF service consumer to access to an NF service producer.

Apart from that, the 5G network also includes a Unified Data Management (UDM) entity, as illustrated in FIG. 1, to store subscriber data and, in a layered architecture, UDM stores data in 5G Unified Data Repository (UDR). The UDR, as illustrated in FIG. 4, supports storage and retrieval of: subscription data by e.g. UDM, policy data by e.g. a Policy Control Function (PCF), and structured data for exposure, and application data for application detection, by e.g. a Network Exposure Function (NEF). The UDM, PCF and NEF communicate with the UDR via the Nudr interface.

3GPP TS 23.502 v15.1.0 basically defines three types of data (Subscription Data, Policy Data and Data for Exposure) stored in the UDR and obtainable from exemplary NF service consumers (UDM, PCF, NEF) with appropriate service operations for the NF service Data Management (DM) provided by the UDR. The 5G UDR is a storage architecture defined to support a data layered architecture, wherein data is stored in the UDR and the logic to access the data is provided in each NF.

In accordance with 3GPP TS 23.501, multiple UDRs could be deployed, each one holding a Data Set, or even the data can be divided in sets of subscribers, e.g. based on either individual SUPIs or SUPI ranges. This requires that the Nudr service registers indicating what data it stores, e.g. Data Set and SUPI ranges or individual SUPIs, and which consumers can read that information at discovery and use this for selection of the corresponding UDR instance. This division/partitioning per subscriber identities and/or subscriber ranges applies to UDR, UDM and AUSF.

3GPP TS 23.502 also discloses UDR service, i.e. a Nudr_Data Management (DM) and operations, as illustrated in FIG. 5.

5G UDR is a storage architecture defined to support a data layered architecture, in the same way as defined for pre-5G (from 3GPP Rel-13 onwards). At that time, a layered architecture was a new paradigm compared to previous monolithic Network Function (NF)/Applications, where both data and logic were part of the same network entities. One of the main advantages of a layered architecture was the centralization and consolidation of subscription data, although it failed to provide an open and easy access to stored data, since 3GPP interface to access pre-5G UDR was not fully standardized (former Ud interface).

5G UDR is an evolution of pre-5G UDR mainly in the following areas: Nudr is defined to be implemented as an SBI; Nudr is defined to be DB technology agnostic (e.g. schema, data model, etc.), based on a data structured conveyed in a JavaScript Object Notation (JSON) body that is under standardization; and, not only subscription data is stored, but new data (as shown in FIG. 4), and to be extensible for new releases. Therefore, 3GPP will achieve a multi-vendor standard access to subscription data and other data that is relevant for multiple consumers.

5G is also developed with the intention to define Service Based Architecture (SBA) services, instead of NF services, which are expected to be more suitable for deployment in Cloud Native Architecture (CNA) to fulfil specific requirements such as: services deployed/developed/updated/upgraded/scaled independently of other services; loose coupling, wherein a service should not always require executing another service, although service chaining may be allowed; reusability; longevity; etc.

To this end, an SBA service is expected to be implemented by multiple micro-services, so that it is possible to access to data within the SBA service via one single micro-service acting as a "data custodian" and only linking this "data custodian" micro-service to an internal data model, which is not coupled to other micro-services. Once this is achieved, it is a good way to take profit of CNA benefits.

However, the Nudr_DM is not an SBA service in the same sense as the rest of SBA services, mainly because it is a logically single (multi-type) data repository, that is, the 5G UDR does not provide the application logic but simply stores data and provides an SBI to access that data. Moreover, the 5G UDR is intended to store different data types and is expected to be extended to store all the data types that different consumers may require.

A first drawback is the UDR complexity increase since support for new data types would require new/revised data models accessed by different keys. Compared to pre-5G UDR, the new 5G UDR has increased in complexity as long as the amount of data has increased, what requires new internal data model, access by different keys, e.g. Application data may not even have a key, or use Application Id, compared to a mandatory subscriber key, while Data for Exposure is not clear yet what will contain. This complexity will increase with new data stored in UDR for future releases. An internal mapping from external standard data structured conveyed in Nudr, by a JSON body, into internal DB-technology-dependent data model is required, what is complex and demands high processing capabilities.

A second drawback is the tightly coupled provisioning derived from having Nudr data structured agnostic from any DB internals so that it is not possible to take profit of rich properties of internal DB native APIs. For example, in Rel-15, only a few data requests are defined, for basic CRUD (Create-Read-Update-Delete) operations. A flexible search, or modification of a single data attribute in a tree shaped structured (like LDAP allows), or in a table structure, is not possible, as long as the effort to standardize that (being DB agnostic) will be huge and potentially not feasible.

This implies that operations required by e.g. a provisioning application, which requires complex searches, massive updates of individual attributes, etc., will not be supported by Nudr. In fact, provisioning is outside 3GPP scope. Then, any commercial UDR solution will require to keep another way to access data plus Nudr. A trend is to keep LDAP, with a proprietary data model, from pre-5G UDR solution and add on top of that the new Nudr HTTP/REST with standard basic data structure.

This implies that the provisioning application, or any other application that requires a richer access than Nudr, like the one offered by native DB APIs, or at least by LDAP, will be coupled to some DB-internals, i.e. there is a dependency on the application design from the data model in the DB or native APIs properties. This is in fact considered an antipattern that should be avoided in CNA. The pattern to follow is to do not allow access to stored data by multiple consumers but offer access via a single micro-service that acts as a data custodian, as commented above.

A third drawback is the needs for application logic for Nudr service registration, discovery and selection. Since UDR stores different types of data, a possible solution may be the deployment of multiple UDR instances, each one holding only one data type. However, the service provided by UDR is unique: Nudr_DM, so that services instances should register in NRF with information of which Data Set is stored, and consumers should receive that information at discovery and use that for selection. But then, the registration/discovery/selection is not application agnostic, what implies that services increase the complexity.

A fourth drawback is the geographical data partitions, which have been used in previous network generations, but which present important constraints for the 5G UDR. For instance, if UDR is partitioned into different sets of subscribers, then different pools of consumers (e.g. UDMs) access only one specific UDR, so there is as well a need for data partitioning between different pools of consumers (e.g. UDMs). Apart from that, Application-logic is required for Nudr service (and its consumers: Nudm, Nausf, Npcf, Nnef) registration, discovery and selection, wherein each Nudr service only provides support for a set of subscribers. That is, there would be a need for a non-scalable and cumbersome to be configured/maintained mapping table between set of subscribers and which Nudr instance (and Nudr service consumers, e.g. Nudm, Nausf, Npcf, Nnef) provides service to those. The set of subscribers may be defined by a range of SUPIs (or more generically UE identifier), but in many cases, as well by individual SUPI(s).

SUMMARY

The invention is set out in the appended set of claims. The present invention is aimed to overcome these drawbacks and provides for a method for accessing a UDR. This method, in an embodiment, comprises splitting a Data Set, which is currently provided in a 5G UDR for a plurality of NF service consumers (e.g. UDM, PCF, NEF), into a plurality of different SBA services, wherein each SBA service is associated with one or more Data Subsets, amongst a plurality of Data Subsets associated with the Data Set, and wherein each SBA service is provided for one or more NF service consumer (e.g. UDM) amongst the plurality of NF service consumers (e.g. UDM, PCF, NEF).

This method, in another embodiment, comprises storing, for a Data Set provided in a UDR for a plurality of NF service consumers (e.g. UDM, PCF, NEF), a plurality of SBA services, wherein each SBA service is associated with one or more Data Subsets, amongst a plurality of Data Subsets associated with the Data Set, and wherein each SBA service is provided for one or more NF service consumer (e.g. UDM) amongst the plurality of NF service consumers (e.g. UDM, PCF, NEF).

The proposal is to evolve the centralized 5G UDR in a traditional layered architecture into multiple different SBA services, each one providing access to a specific, independent and limited set of data (implementing a kind of "data custodian" pattern for that data), that is only accessible by same service operations. Thus, in both embodiments above, this method also comprises registering, from the UDR toward an NRF, identifiers for the plurality of SBA services handled at the UDR and an identifier of the UDR; receiving, at the NRF from an NF service consumer, a service discovery request with an identifier of an SBA service; given that the NRF is aware of the UDR handling the SBA service, transmitting, from the NRF toward the NF service consumer, the identifier of the UDR handling the SBA service; transmitting, from the NF service consumer toward the UDR identified by the identifier of the UDR, a service request for the SBA service; and receiving, at the NF service consumer from the UDR, information data relating to the one or more Data Subsets associated with the SBA service.

For illustrative purposes, this document focusses on Subscription data required for existing 5G (data) consumers: Access and Mobility Management Function (AMF), Session Management Function (SMF) and SMS Function (SMSF), via UDM. Same analysis will be applicable to Subscription data required for other Nudr consumers (e.g. PCF, NEF) or to other Data Sets stored in UDR.

In an embodiment, the following SBA services are provided:

Access and Mobility subscription data mng (AccessMobilitySubsData), which owns following Data Subsets: Access and Mobility Subscription data, Slice Selection Subscription data, UE context in AMF data. It also owns data provided at AMF (or similar future new consumer) registration.

Session subscription data mng (SessionSubsData), which owns following Data Subsets: SMF Selection Subscription data, UE context in SMF data, Session Management Subscription data. It also owns data provided at SMF (or similar future new consumer) registration.

SMS subscription data mng (SMSSubsData), which owns following Data Subsets: SMS Management Subscription data, SMS Subscription data. It also owns data provided at SMSF (or similar future new consumer) registration.

For all new SBA services, Query, Update, Subscribe, Unsubscribe and Notify Service Operations are defined; and, for each Service Operation, the Operation Semantics is also defined.

On the other hand, the invention may be practised by a computer program, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 represents a Roaming 5G System architecture-local breakout scenario with an Application Function (AF) in VPLMN in a service-based interface representation.

FIG. 2 shows a Service Registration of an NF service provider in an NRF.

FIG. 3 shows Service Discovery of an NF service provider by an NF service consumer in an NRF.

FIG. 4 shows a basic component structure with 5G UDR contents and consumers.

FIG. 5 shows Nudr_DM service operations for the NF service and exemplary NF service consumers.

FIG. 6 shows Nudr_DM Data Subsets for Data Set corresponding to the NF service.

FIG. 7 shows SBA services and service operations for the NF service and exemplary NF service consumers.

FIG. 8 shows a basic component structure with SBA services and data in a 5G UDR and consumers accessing the SBA services and data.

FIG. 9 shows a basic component structure of a UDR in accordance with an embodiment.

FIG. 10 shows a basic component structure of an NF service consumer node in accordance with an embodiment.

FIG. 11 illustrates an exemplary sequence of actions carried out by the UDR, in accordance with an embodiment.

FIG. 12 illustrates an exemplary sequence of actions carried out by the UDR, in accordance with another embodiment.

FIG. 13 illustrates an exemplary sequence of actions carried out by the NF service consumer node, in accordance with an embodiment.

FIG. 14 illustrates an exemplary sequence of actions further carried out by a UDM acting as the NF service consumer node, in accordance with an embodiment.

FIG. 15 shows a basic component structure of a UDR in accordance with another embodiment.

FIG. 16 shows a basic component structure of an NF service consumer node in accordance with another embodiment.

FIG. 17 illustrates an exemplary sequence of actions carried out for service registration and discovery, in accordance with 3GPP.

FIG. 18 illustrates an exemplary sequence of actions carried out for service execution and selecting storage, in accordance with an embodiment.

FIG. 19 illustrates an exemplary sequence of actions carried out for service registration and discovery, in accordance with an embodiment.

DETAILED DESCRIPTION

The following describes currently preferred embodiments of apparatuses and methods to evolve the centralized 5G UDR in a traditional layered architecture into multiple different SBA services, each one providing access to a specific, independent and limited set of data (implementing a kind of "data custodian" pattern for that data), that is only accessible by same service operations. In this way, constrains identified above for the development of UDR and its consumers are either overcome or minimized, and these new SBA services fits perfectly in a CNA.

For illustrative purposes, this document focusses on Subscription data required for existing 5G data consumers: AMF, SMF and SMSF, all via UDM. Same analysis can be applicable to Subscription data required for other Nudr consumers (e.g. PCF, NEF) or to other Data Sets stored in UDR.

The AMF, SMF and SMSF access to data, with Nudm_SDM service, via UDM that retrieves data, with Nudr_DM service, from UDR. In this respect, Nudm_SDM service performs some logic on top of data retrieved from UDR, like feature support, data access authorization enforcement, etc.

Data currently retrieved by AMF, SMF and SMSF, with Nudm_SDM service via UDM, is disclosed in 3GPP TS 23.502 clause 5.2.3.3.1, organized in so called Subscription Data Types, i.e. group of data that is retrieved at once, as shown in the Table I below.

TABLE I

Nudm_SDM Subscription Data Types

| Subscription data type | Field | Description |
| --- | --- | --- |
| Access and Mobility Subscription data (data needed for UE Registration and Mobility Management) | SUPI | Key |
| | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |

TABLE I-continued

Nudm_SDM Subscription Data Types

| Subscription data type | Field | Description |
|---|---|---|
| | Subscribed S-NSSAIs | The Network Slices that the UE subscribes to. |
| | Default S-NSSAIs | The Subscribed S-NSSAIs marked as default S-NSSAI. |
| | UE Usage Type | As defined in TS 23.501 [2], clause 5.15.7.2. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC for this PLMN. |
| | RFSP Index | An index to specific RRM configuration in the NG-RAN. |
| | Subscribed Periodic Registration Timer | Indicates a subscribed Periodic Registration Timer value. |
| | Priority Services | Indicates the user is subscribed to priority.service (MPS) as indicated in TS 23.501 [2], clause 5.16.5. |
| Slice Selection Subscription data (data needed for Slice Selection as described in clause 4.2.2.2.3) | SUPI | Key |
| | Subscribed S-NSSAIs | The Network Slices that the UE subscribes to. In roaming case, it indicates the subscribed network slices applicable to the serving PLMN. |
| UE context in AMF data | SUPI | Key |
| | AMF | Allocated AMF for the registered UE. Include AMF address and AMF NF Id. |
| | Access Type | 3GPP or non-3GPP access through this AMF |
| SMF Selection Subscription data (data needed for SMF Selection as described in clause 6.3.2 of TS 23.501 [2]) | SUPI | Key |
| | Subscribed DNN list | List of the subscribed DNNs for the UE. |
| | Default DNN | The default DNN if the UE does not provide a valid DNN. |
| | LBO Roaming Information | Indicates whether LBO roaming is allowed per DNN, or per (S-NSSAI, subscribed DNN) |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |
| SMS Management Subscription data (data needed by SMSF for SMSF Registration) | SUPI | Key |
| | SMS parameters | Indicates SMS parameters subscribed for SMS service such as SMS teleservice, SMS barring list |
| SMS Subscription data (data needed in AMF) | SUPI | Key |
| | SMS Supported | Indicates whether the UE supports SMS delivery over NAS via 3GPP access, or via non-3GPP access, or via both the 3GPP and non-3GPP access. |
| | SMSF address | Indicates SMSF address subscribed for SMS service. |
| Session Management Subscription data (data needed for PDU Session Establishment) | SUPI | Key |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI. |
| | For each DNN in S-NSSAI level subscription data: | |
| | UE Address | Indicates the subscribed static IP address(es) for the IPV4 or IPv6 or IPv4v6 type PDU Sessions accessing the DNN, S-NSSAI. |
| | Allowed PDU Session Types | Indicates the allowed PDU Session Types (IPv4, IPv6, IPv4v6, Ethernet, and Unstructured) for the DNN, S-NSSAI. |

TABLE I-continued

Nudm_SDM Subscription Data Types

| Subscription data type | Field | Description |
| --- | --- | --- |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | This information is defined in TS 32.240 [34]; it may e.g. contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| Identifier translation | GPSI | Generic Public Subscription Identifier used inside and outside of the 3GPP system to address a 3GPP subscription. Used as the Key for translation to the corresponding SUPI (and optionally corresponding MSISDN). |
| | SUPI | Corresponding SUPI for input GPSI |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |

These Subscription Data Types are retrieved by UDM from UDR as a whole. However, 3GPP TS 23.502 clause 5.2.12.2.1 discloses a different data structure for Nudr, wherein a Data Set Subscription Data corresponds to the complete Table I disclosed above (as disclosed in clause 5.2.3.3.1), and wherein this Data Set is associated with a plurality of so-called Data Subsets, as disclosed in FIG. 6.

Regarding the definition of SBA services, which aims the present specification, multiple options are possible, depending on the granularity of the functionality to be provided, what identifies the data owned by each service.

In this specification, the following SBA services 20, as illustrated in FIG. 7, are discussed:

Access and Mobility subscription data mng (AccessMobilitySubsData) 20a, which owns following Data Subsets: Access and Mobility Subscription data, Slice Selection Subscription data, UE context in AMF data. It also owns data provided at AMF (or similar future new consumer) registration.

Session subscription data mng (SessionSubsData) 20b, which owns following Data Subsets: SMF Selection Subscription data, UE context in SMF data, Session Management Subscription data. It also owns data provided at SMF (or similar future new consumer) registration.

SMS subscription data mng (SMSSubsData) 20c, which owns following Data Subsets: SMS Management Subscription data, SMS Subscription data. It also owns data provided at SMSF (or similar future new consumer) registration.

For all new SBA services 20, Query, Update, Subscribe, Unsubscribe and Notify Service Operations 26 are defined; and, for each Service Operation, the Operation Semantics 27 is also defined, as also shown in FIG. 7.

With the splitting of a previous Data Set into a plurality of different and specific SBA services, the AMF, SMF and SMSF (as defined in 3GPP TS 23.502 call flows) can keep on requesting Subscription Data Types 10a from UDM that, instead of getting corresponding data from UDR via Nudr_DM for each corresponding Data Subsets 12, it can access corresponding specific information thanks to a query operation on the corresponding new proposed SBA service 20a, 20b or 20c, as the case may be.

For example, in an embodiment illustrated in FIG. 8, the UDM 4 may determine that for a request for Subscription Data Types 10a received from the AMF 7, the UDM 4 retrieves Access and Mobility subscription data mng 20a from the UDR 1; whereas for a request for Subscription Data Types 10a received from the SMF 8, the UDM 4 retrieves Session subscription data mng 20b.

A further improvement of defining the SBA services is discussed with reference to the exemplary registration procedure call flow disclosed in 3GPP TS 23.502 clause 4.2.2.2.2. Interactions between UDM and UDR are not shown, for the shake of simplicity, in the figure for this call flow, but are reflected in the corresponding text for actions 14a, 14b, 14c and 14d.

With the definition of the new SBA services, as discussed above, the actions 14a, 14b, 14c and 14d in clause 4.2.2.2.2 of 3GPP TS 23.502 require some modifications discussed in the following.

Action 14a-b. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration and subscribes to be notified when the UDM deregisters this AMF. The UDM stores the AMF identity associated to the Access Type and does not remove the AMF identity associated to the other Access Type. The UDM stores information provided at registration in AccessMobilitySubsData service, by Update operation.

The AMF retrieves the Access and Mobility Subscription data, SMF Selection Subscription data and UE context in SMF data using Nudm_SDM_Get. This requires that UDM retrieves this information from AccessMobilitySubsData and SessionSubsData services by Query operations. After a successful response is received, the AMF subscribes to be notified using Nudm_SDM_Subscribe when the data requested is modified, UDM subscribes to AccessMobilitySubsData and SessionSubsData services by Subscribe operations. The GPSI is provided to the AMF in the Access and Mobility Subscription data from the UDM if the GPSI is available in the UE subscription data.

The new AMF provides the Access Type it serves for the UE to the UDM and the Access Type is set to "3GPP access". The UDM stores the associated Access Type together with the serving AMF in AccessMobilitySubsData by Update operation.

The new AMF creates an MM context for the UE after getting the Access and Mobility Subscription data from the UDM.

For an Emergency Registration in which the UE was not successfully authenticated, the AMF shall not register with the UDM.

For an Emergency Registration, the AMF shall not check for access restrictions, regional restrictions or subscription restrictions. For an Emergency Registration, the AMF shall ignore any unsuccessful registration response from UDM and continue with the Registration procedure.

Action 14c. When the UDM stores the associated Access Type (e.g. 3GPP) together with the serving AMF as indicated in step 14a, it will cause the UDM to initiate a Nudm_UECM_DeregistrationNotification (see clause 5.2.3.2.2) to the old AMF corresponding to the same (e.g. 3GPP) access, if one exists. The old AMF removes the MM context of the UE. If the serving NF removal reason indicated by the UDM is Initial Registration, then, as described in clause 4.2.2.3.2, the old AMF invokes the Nsmf_PDUSession_ReleaseSMContext (SUPI, PDU Session ID) service operation towards all the associated SMF(s) of the UE to notify that the UE is deregistered from old AMF. The SMF(s) shall release the PDU Session on getting this notification.

Action 14d. The Old AMF unsubscribes with the UDM for subscription data using Nudm_SDM_unsubscribe.

That is, the access to the whole Data Set Subscription Data 10b in the UDR 1, is replaced by the access to a particular SBA service 20a, 20b or 20c depending on the required data in each case.

An advantage of this proposal is that such solution fits into 3GPP Rel-16, where it is expected that Services are deployed independently from any NF, that is, Services need to be independent. Therefore, there is not a need to define any new NF, or to keep existing UDR, but on the contrary, the new proposed services are used independently of any NF.

There is thus provided, in the present specification, a method for accessing data in a UDR 1, the method carried out at the UDR.

In accordance with an embodiment illustrated in FIG. 11, this method comprises a step S-1110 of splitting a Data Set 10b, which is provided in the UDR for a plurality of NF service consumers 11, into a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11.

In this embodiment, the method also comprises a step S-1120 of registering, toward an NRF 2, identifiers for the plurality of SBA services e.g. 20a, 20b, 20c handled at the UDR and an identifier of the UDR; a step S-1130 of receiving, from an NF service consumer 3, a service request for an SBA service e.g. 20a; and a step S-1140 of transmitting, toward the NF service consumer 3, information data relating to the one or more Data Subsets e.g. 22a, 23a, 24a, 25a associated with the SBA service e.g. 20a.

In accordance with another embodiment illustrated in FIG. 12, this method comprises a step S-1210 of storing, for a Data Set 10b provided in the UDR for a plurality of NF service consumers 11, a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11.

In this another embodiment, the method also comprises a step S-1220 of registering, toward an NRF 2, identifiers for the plurality of SBA services e.g. 20a, 20b, 20c handled at the UDR and an identifier of the UDR; a step S-1230 of receiving, from an NF service consumer 3, a service request for an SBA service e.g. 20a; and a step S-1240 of transmitting, toward the NF service consumer 3, information data relating to the one or more Data Subsets e.g. 22a, 23a, 24a, 25a associated with the SBA service e.g. 20a.

There is also provided, in the present specification, a method for accessing data in a UDR 1, the method carried out at an NF service customer node 3 or 4.

In accordance with an embodiment illustrated in FIG. 13, this method comprises a step S-1310 of transmitting, toward a NRF 2, a service discovery request with an identifier of an SBA service e.g. 20a; a step S-1320 of receiving, from the NRF 2, an identifier of the UDR 1 instance handling the SBA service 20a; a step S-1330 of transmitting, toward the UDR 1 identified by the identifier of the UDR instance, a service request for the SBA service 20a; and a step S-1340 of receiving, from the UDR 1, information data relating to the one or more Data Subsets e.g. 22a, 23a, 24a, 25a associated with the SBA service 20a.

In a sub-embodiment illustrated in FIG. 14, for the embodiment discussed above with reference to FIG. 13, and in the case where the NF service customer node is a UDM 4, this method may also comprise a step S-1410 of receiving, from a further network node (such as an AMF node 7 or an SMF node 8 may be), an NF service 10a request for a Data Set 10b provided in the UDR 1 for a plurality of NF service consumers 11; and a step S-1420 of determining, based on the further network node e.g. 7 or 8, an SBA service 20a for which the service request is transmitted toward the UDR 1.

When this is the case, upon receiving from the UDR 1, during the step S-1340 commented above, the information data relating to the one or more Data Subsets (e.g. 22a, 23a, 24a, 25a) associated with the SBA service e.g. 20a, this method further comprises a step S-1430 of transmitting, toward the further network node 7 or 8, an NF service 10a response in accordance with the information data relating to the one or more Data Subsets (e.g. 22a, 23a, 24a, 25a).

In order to carry out these methods discussed with reference to FIG. 11 and FIG. 12, different embodiments of the UDR 1 or 60 are illustrated in FIG. 9 and FIG. 15.

In accordance with an embodiment illustrated in FIG. 9, the UDR 60 or 1 may comprise at least one processor 620, and at least one memory 610 that stores processor-executable instructions 614. In this UDR, the at least one processor interfaces with the at least one memory to execute the processor-executable instructions, whereby the UDR is operable to perform the actions disclosed in the following.

This UDR illustrated in FIG. 9, in an embodiment, may thus be operable to split a Data Set 10b, which is provided in the UDR for a plurality of NF service consumers 11, into a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11. In a sub-embodiment, a service handler 627 running in a processor 620 may split the Data Set into the plurality of SBA services.

This UDR illustrated in FIG. 9, in another embodiment, may be operable to store, for a Data Set 10b provided in the UDR for a plurality of NF service consumers 11, a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11. In a sub-embodiment, a service handler 627 running in a processor 620 may store, for the Data Set, the plurality of SBA services.

In both embodiments, this UDR illustrated in FIG. 9 may also be operable to register, toward an NRF 2 via transmitter 640, identifiers for the plurality of SBA services 20a, 20b, 20c handled at the UDR and an identifier of the UDR; receive, from an NF service consumer 3 via receiver 630, a service request for an SBA service e.g. 20a; and transmit, toward the NF service consumer 3 via the transmitter 640, information data relating to the one or more Data Subsets e.g. 22a, 23a, 24a, 25a associated with the SBA service e.g. 20a.

In sub-embodiments for both embodiments, the service handler 627 running in the processor 620 may handle the logic related to the SBA services, such as the registration and fetching the data relating to the one or more Data associated with the SBA service, whereas a protocol handler 627 running in a processor 620 may control the transmitter 640 and receiver 630 for transmission and reception of messages.

If required at all, the UDR 60 or 1, illustrated in FIG. 9, may be complemented with a data section 618 in memory to store the SBA services and respective Data subsets along with NF service consumers for each SBA service.

The UDR illustrated in FIG. 9 may thus comprise the at least one processor 620 and the at least one memory 610, both in communication with each other, with the protocol handler 624, the service handler 627, the receiver 630 and the transmitter 640, and with other elements or units of the UDR. The at least one memory 610 may comprise volatile and/or non-volatile memory. In particular, the at least one memory 610 may have a computer program 614 and data 618 stored therein. The computer program 614 may be loaded in the at least one memory 610 from a computer program product 650, such as any non-transitory computer readable medium, in which the computer program is stored. The data 618 may comprise the SBA services and respective Data subsets along with NF service consumers for each SBA service. The at least one processor 620 may be configured to carry out the functions of the protocol handler 624 and the service handler 627.

In accordance with another embodiment illustrated in FIG. 15, the UDR 60 or 1, in an embodiment, may be operable to split a Data Set 10b, which is provided in the UDR for a plurality of NF service consumers 11, into a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11. In a sub-embodiment, a service handler 627 running in a processor 620 may split the Data Set into the plurality of SBA services.

This UDR illustrated in FIG. 15, in another embodiment, may be operable to store, for a Data Set 10b provided in the UDR for a plurality of NF service consumers 11, a plurality of SBA services 20, wherein each SBA service e.g. 20a is associated with one or more Data Subsets e.g. 22a, 23a, 24a, 25a, amongst a plurality of Data Subsets 12 associated with the Data Set 10b, and wherein each SBA service e.g. 20a is provided for one or more NF service consumer 21 amongst the plurality of NF service consumers 11. In a sub-embodiment, a service handler 627 running in a processor 620 may store, for the Data Set, the plurality of SBA services.

In both embodiments, this UDR illustrated in FIG. 15 may also be operable to register, toward an NRF 2 via transmitter 640, identifiers for the plurality of SBA services 20a, 20b, 20c handled at the UDR and an identifier of the UDR; receive, from an NF service consumer 3 via receiver 630, a service request for an SBA service e.g. 20a; and transmit, toward the NF service consumer 3 via the transmitter 640, information data relating to the one or more Data Subsets e.g. 22a, 23a, 24a, 25a associated with the SBA service e.g. 20a.

In sub-embodiments for both embodiments discussed above with reference to FIG. 15, the UDR may comprise a service handler 627 operable to handle the logic related to the SBA services, such as the registration and fetching the data relating to the one or more Data associated with the SBA service, and a protocol handler 627 operable to control the transmitter 640 and receiver 630 for transmission and reception of messages.

In order to carry out these methods discussed above with reference to FIG. 13 and FIG. 14, different embodiments of the NF service consumer node 70, 3 or 4 are illustrated in FIG. 10 and FIG. 16.

In accordance with an embodiment illustrated in FIG. 10, the NF service consumer node 70, 3 or 4 may comprise at least one processor 720, and at least one memory 710 that stores processor-executable instructions 714. In this NF service consumer node, the at least one processor interfaces with the at least one memory to execute the processor-executable instructions, whereby the NF service consumer node is operable to perform the actions disclosed in the following.

This NF service consumer node, illustrated in FIG. 10, may thus be operable to transmit, toward an NRF 2 via transmitter 740, a service discovery request with an identifier of an SBA service e.g. 20a; receive, from the NRF 2 via receiver 730, an identifier of the UDR 1 instance handling the SBA service e.g. 20a; transmit, toward the UDR 1 identified by the identifier of the UDR instance via the transmitter 740, a service request for the SBA service (20a); and receive, from the UDR 1 via the receiver 730, information data relating to the one or more Data Subsets e.g. 22a, 23a, 24a, 25a associated with the SBA service e.g. 20a.

This NF service consumer node illustrated in FIG. 10, in an embodiment wherein the NF service consumer node implements a UDM 4, may further be operable to receive, from a further network node, such as an AMF node 7 or an SMF node 8 might be, via the receiver 730, an NF service 10a request for a Data Set 10b provided in the UDR 1 for a plurality of NF service consumers 11; determine, based on the further network node, an SBA service e.g. 20a for which the service request is transmitted toward the UDR 1; and, upon receiving, from the UDR 1, the information data relating to the one or more Data Subsets e.g. 22a, 23a, 24a, 25a associated with the SBA service e.g. 20a, transmit, toward the further network node via the transmitter 740, an NF service 10a response in accordance with the information data relating to the one or more Data Subsets e.g. 22a, 23a, 24a, 25a.

In sub-embodiments, the NF service consumer node illustrated in FIG. 10 may comprise a service handler 728 running in the processor 720 configured to handle the logic related to the SBA services, such as SBA service discovery and fetching the data relating to the one or more Data associated with the SBA service, and a UDR protocol handler 726 running in a processor 720 configured to control the transmitter 740 and receiver 730 for transmission and reception of messages.

In the embodiment where the NF service consumer node 70 implements a UDM 4, the NF service consumer node illustrated in FIG. 10 may comprise a UDM protocol handler 724 running in a processor 720 configured to control the transmitter 740 and receiver 730 for transmission and reception of messages to and from the further network node, such as an AMF node 7 or an SMF node 8 might be.

If required at all, the NF service consumer node 70, 3 or 4, as illustrated in FIG. 10, may be complemented with a data section 718 in memory to store the SBA services and respective Data subsets for each SBA service.

The NF service consumer node illustrated in FIG. 10 may thus comprise the at least one processor 720 and the at least one memory 710, both in communication with each other, with the UDM protocol handler 724 (if provided), the UDR protocol handler 726, the service handler 728, the receiver 730 and the transmitter 740, and with other elements or units of the NF service consumer node. The at least one memory 710 may comprise volatile and/or non-volatile memory. In particular, the at least one memory 710 may have a computer program 714 and data 718 stored therein. The computer program 714 may be loaded in the at least one memory 710 from a computer program product 750, such as any non-transitory computer readable medium, in which the computer program is stored. The data 718 may comprise the SBA services and respective Data subsets for each SBA service. The at least one processor 720 may be configured to carry out the functions of the UDM protocol handler 724 (if provided), the UDR protocol handler 726 and the service handler 728.

In accordance with another embodiment illustrated in FIG. 16, the NF service consumer node 70, 3 or 4 may be operable to transmit, toward an NRF 2 via transmitter 740, a service discovery request with an identifier of an SBA service e.g. 20a; receive, from the NRF 2 via receiver 730, an identifier of the UDR 1 instance handling the SBA service e.g. 20a; transmit, toward the UDR 1 identified by the identifier of the UDR instance via the transmitter 740, a service request for the SBA service (20a); and receive, from the UDR 1 via the receiver 730, information data relating to the one or more Data Subsets e.g. 22a, 23a, 24a, 25a associated with the SBA service e.g. 20a.

This NF service consumer node illustrated in FIG. 16, in an embodiment wherein the NF service consumer node implements a UDM 4, may further be operable to receive, from a further network node, such as an AMF node 7 or an SMF node 8 might be, via the receiver 730, an NF service 10a request for a Data Set 10b provided in the UDR 1 for a plurality of NF service consumers 11; determine, based on the further network node, an SBA service e.g. 20a for which the service request is transmitted toward the UDR 1; and, upon receiving, from the UDR 1, the information data relating to the one or more Data Subsets e.g. 22a, 23a, 24a, 25a associated with the SBA service e.g. 20a, transmit, toward the further network node via the transmitter 740, an NF service 10a response in accordance with the information data relating to the one or more Data Subsets e.g. 22a, 23a, 24a, 25a.

In sub-embodiments, the NF service consumer node illustrated in FIG. 16 may comprise a service handler 728 configured to handle the logic related to the SBA services, such as SBA service discovery and fetching the data relating to the one or more Data associated with the SBA service, and a UDR protocol handler 726 configured to control the transmitter 740 and receiver 730 for transmission and reception of messages.

In the embodiment where the NF service consumer node 70 implements a UDM 4, the NF service consumer node illustrated in FIG. 16 may comprise a UDM protocol handler 724 configured to control the transmitter 740 and receiver 730 for transmission and reception of messages to and from the further network node, such as an AMF node 7 or an SMF node 8 might be.

On the other hand, FIG. 17 illustrates a method in accordance with 3GPP TS 23.501 and TS 23.502.

In this method, actions S-1710 to S-1730 may be performed in any order. Each UDR registers its NF profile. We have as an example 3 different UDRs, each storing a different set of data. In this respect, TS 23.501 clause 6.2.6 discloses the NF profile contents of NF instances maintained in an NRF. Each Nudr_DM service, for each UDR NF, has to provide corresponding "Identification of stored data/information", that is, the means to identify whether it is UDR-1, UDR-2 or UDR-3, and which data is stored in each one, allowing the consumer to select which one to use.

Action S-1740. The UDR consumer, i.e. the consumer of the Nudr_DM service (in this example UDM) needs to indicate the NF and service name to be discovered (i.e. Nudr_DM) and it will get back, Action S-1750, the information for each the Nudr_DM that are registered, with the NF profile information, what identifies the set of data that is stored in each one.

Consequently, a method for service execution and selecting storage, as illustrated in FIG. 18, can be followed so that an UDM Front End (UDM-FE) is able to distinguish the destination UDR depending on required data, as is described in following figure, at selection of destination provider service. As illustrated in FIG. 18:

Action S-1810. As an exemplary use case, we can consider when AMF needs to get access to one UE subscriber data. It requests that information from UDM-FE, using Nudm_SubsDataMng_Get operation, for one specific UE identify (e.g. SUPIx).

Action S-1820. UDM-FE needs to identify which Nudr service needs to use to access corresponding data. It needs to check provided information at registration and as well some local configuration may be required. In our example, we consider only one UDR stores subscription data.

Action S-1830. UDM-FE executes Nudr service that is registered by UDR-1 (i.e. using provided IP address or FQDN).

This method illustrated in FIG. 18 requires, as the one described with reference to FIG. 17, some information to be provided at registration, to be stored in the NRF, and then be provided at discovery to the service consumer. In addition, the service consumer needs to store this information and check it every time for selection of the right instance.

That is, Nudr_DM Service as defined in existing TSs, requires knowledge of the internals of UDR, i.e. knowledge of different Data Sets stored, and even about possible subscription partitions. This knowledge is required not only by the Nudr_DM but by any of its consumers, and the NRF. Apart from that, this information is required to be stored in both the NRF and any consumer.

All this requires managing data, storage needs, and increases service consumer and producer complexity.

However, in accordance with an embodiment of the present specification, there is provided a new method for service registration and discovery as illustrated in FIG. 19. This method, based on the distribution of internal data sets or even subsets into different services (rather than using only one Nudr_DM service), is based on a data-agnostic (and application-agnostic) registration, discovery and selection. As illustrated in FIG. 19:

Actions S-1910 to S-1930. Each set of data is accessible via a different new service, e.g. NewServiceSubsData, NewServiceApplicationData, NewServiceExpData. Then, each service is registered, without the need to provide anything else.

Action S-1940. At discovery, the UDR consumer (in this example, UDM), discovers the service that requires. In this case, it is NewServiceSubsData, since it requires to access Subscription data.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

Further advantages of this solution are discussed in the following.

A first advantage is that UDR complexity is limited and even decreased compared to pre-5G UDR. Instead of storing "all" data under the same Nudr service, new independent and smaller services are defined. Each one has a smaller amount of data and a limited set of use cases to model. Mapping from Nudr standard data structure to internal data model is more affordable and less complex.

A second advantage is that Nudr standard data structure limitations are decreased and Provisioning coupling may be reduced. Still Nudr aims for basic CRUD (Create-Read-Update-Delete) operations. But a simple search, or modification of a single data attribute may be more affordable and potentially feasible to be standardized in 3GPP, since the complexity of the data to manage/access may be very much reduced. In this way, still provisioning applications will be couple to internal data models, but the coupling may be limited, based on the possibility to enrich Nudr standard access.

A third advantage is that Application-logic is not required for Nudr service registration, discovery and selection. Different services are registered, discovered and/or selected. This follows some operators' view that services should be simplified, excluding any logic (like addressing) that is not required to perform the functionality they offer. This simplifies service providers and consumers logic and hence development and updating.

A fourth advantage is that Subscriber Data partition may not be required (it depends on each implementation solution for the new proposed services). Different independent services are defined to access smaller sets of data, this implies that the amount of data that is required to be access by each service is smaller. As new data is standardized, this would not be placed in an ever-growing UDR, but new services would be defined to provide correct access to that data. Therefore, it is possible to avoid reaching the maximum limits of scalability, although this depends on every specific implementation solution, since scalability limits are not only due to the maximum amount of data stored, but it depends as well e.g. on the number of subscribers and traffic model. But for the same requirements (traffic model, number of subscribers, etc.), having smaller services (with much less data than the big Nudr service) makes the scalability limits much further to be reached. Therefore, when Subscriber data partitions are not required, this simplifies network deployments. Apart from that, application-logic is not required for Nudr service (and its consumers: Nudm, Nausf, Npcf, Nnef) registration, discovery and selection.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

In this respect, some preliminary embodiments are listed in the following.

Embodiments:

1. A method for accessing data in a Unified Data Repository (1), UDR, the method comprising:
    splitting a Data Set (10*b*), which is provided in a UDR for a plurality of Network Function, NF, service consumers (11), into a plurality of Service Based Architecture, SBA, services (20), wherein each SBA service (20*a*) is associated with one or more Data Subsets (22*a*, 23*a*, 24*a*, 25*a*), amongst a plurality of Data Subsets (12) associated with the Data Set (10*b*), and wherein each SBA service (20*a*) is provided for one or more NF service consumer (21) amongst the plurality of NF service consumers (11);

registering, from the UDR toward a Network Repository Function (2), NRF, identifiers for the plurality of SBA services (20*a*, 20*b*, 20*c*) handled at the UDR and an identifier of the UDR;

receiving, at the NRF (2) from an NF service consumer (3), a service discovery request with an identifier of an SBA service (20*a*);

determining, at the NRF (2), an UDR instance handling the SBA service (20*a*);

transmitting, from the NRF (2) toward the NF service consumer (3), an identifier of the UDR instance handling the SBA service (20*a*);

transmitting, from the NF service consumer (3) toward the UDR (1) identified by the identifier of the UDR instance, a service request for the SBA service (20*a*); and receiving, at the NF service consumer (3) from the UDR (1), information data relating to the one or more Data Subsets (22*a*, 23*a*, 24*a*, 25*a*) associated with the SBA service (20*a*).

2. A method for accessing data in a Unified Data Repository (1), UDR, the method comprising:

storing, for a Data Set (10*b*) provided in a UDR for a plurality of Network Function, NF, service consumers (11), a plurality of Service Based Architecture, SBA, services (20), wherein each SBA service (20*a*) is associated with one or more Data Subsets (22*a*, 23*a*, 24*a*, 25*a*), amongst a plurality of Data Subsets (12) associated with the Data Set (10*b*), and wherein each SBA service (20*a*) is provided for one or more NF service consumer (21) amongst the plurality of NF service consumers (11);

registering, from the UDR toward a Network Repository Function (2), NRF, identifiers for the plurality of SBA services (20*a*, 20*b*, 20*c*) handled at the UDR and an identifier of the UDR;

receiving, at the NRF (2) from an NF service consumer (3), a service discovery request with an identifier of an SBA service (20*a*);

determining, at the NRF (2), an UDR instance handling the SBA service (20*a*);

transmitting, from the NRF (2) toward the NF service consumer (3), an identifier of the UDR instance handling the SBA service (20*a*);

transmitting, from the NF service consumer (3) toward the UDR (1) identified by the identifier of the UDR instance, a service request for the SBA service (20*a*); and receiving, at the NF service consumer (3) from the UDR (1), information data relating to the one or more Data Subsets (22*a*, 23*a*, 24*a*, 25*a*) associated with the SBA service (20*a*).

3. A method for accessing data in a Unified Data Repository (1), UDR, the method carried out at the UDR (1) and comprising:

splitting (S-1110) a Data Set (10*b*), which is provided in the UDR for a plurality of Network Function, NF, service consumers (11), into a plurality of Service Based Architecture, SBA, services (20), wherein each SBA service (20*a*) is associated with one or more Data Subsets (22*a*, 23*a*, 24*a*, 25*a*), amongst a plurality of Data Subsets (12) associated with the Data Set (10*b*), and wherein each SBA service (20*a*) is provided for one or more NF service consumer (21) amongst the plurality of NF service consumers (11);

registering (S-1120), toward a Network Repository Function (2), NRF, identifiers for the plurality of SBA services (20*a*, 20*b*, 20*c*) handled at the UDR and an identifier of the UDR;

receiving (S-1130), from an NF service consumer (3), a service request for an SBA service (20*a*); and transmitting (S-1140), toward the NF service consumer (3), information data relating to the one or more Data Subsets (22*a*, 23*a*, 24*a*, 25*a*) associated with the SBA service (20*a*).

4. A method for accessing data in a Unified Data Repository (1), UDR, the method carried out at the UDR (1) and comprising:

storing (S-1210), for a Data Set (10*b*) provided in the UDR for a plurality of Network Function, NF, service consumers (11), a plurality of Service Based Architecture, SBA, services (20), wherein each SBA service (20*a*) is associated with one or more Data Subsets (22*a*, 23*a*, 24*a*, 25*a*), amongst a plurality of Data Subsets (12) associated with the Data Set (10*b*), and wherein each SBA service (20*a*) is provided for one or more NF service consumer (21) amongst the plurality of NF service consumers (11);

registering (S-1220), toward a Network Repository Function (2), NRF, identifiers for the plurality of SBA services (20*a*, 20*b*, 20*c*) handled at the UDR and an identifier of the UDR;

receiving (S-1230), from an NF service consumer (3), a service request for an SBA service (20*a*); and transmitting (S-1240), toward the NF service consumer (3), information data relating to the one or more Data Subsets (22*a*, 23*a*, 24*a*, 25*a*) associated with the SBA service (20*a*).

5. The method of any one of embodiments 1 or 4, wherein registering identifiers for the plurality of SBA services (20*a*, 20*b*, 20*c*) comprises registering, for each SBA service (20*a*), identifiers for the associated one or more Data Subsets (22*a*, 23*a*, 24*a*, 25*a*).

6. The method of any one of embodiments 1 to 5, wherein the Data Set (10*b*) corresponds to a so-called Data Management, DM, NF service (10*a*).

7. The method of any one of embodiments 1 to 5, wherein the Data Set (10*b*) corresponds to a Subscription Data set.

8. The method of any one of embodiments 1 to 7, wherein an SBA service (20) corresponds to an Access and Mobility subscription data management (20*a*) and its associated one or more Data Subsets (22*a*, 23*a*, 24*a*, 25*a*) comprises any one of: Access and Mobility Subscription data, Slice Selection Subscription data, UE context in AMF data and AMF registration data.

9. The method of any one of embodiments 1 to 8, wherein an SBA service (20) corresponds to a Session subscription data management (20*b*) and its associated one or more Data Subsets (22*b*, 23*b*, 24*b*, 25*b*) comprises any one of: SMF Selection Subscription data, UE context in SMF data, Session Management Subscription data and SMF registration data.

10. The method of any one of embodiments 1 to 9, wherein an SBA service (20) corresponds to an SMS subscription data management (20*c*) and its associated one or more Data Subsets (22*c*, 23*c*, 24*c*) comprises any one of: SMS Management Subscription data, SMS Subscription data and SMSF registration data.

11. The method of any one of embodiments 1 to 10, wherein different set of values for the one or more Data Subsets (22a, 23a, 24a, 25a), which are associated with each SBA service (20a), are stored per user or user equipment, UE, basis.

12. The method of any one of embodiments 1 to 11, wherein Query, Update, Subscribe, Unsubscribe and Notify operations are defined for each SBA service and usable by the one or more NF service consumer.

13. The method of embodiments 11 and 12, wherein each Query, Update, Subscribe, Unsubscribe and Notify operation is usable by the one or more NF service consumer per user or UE basis.

14. A Unified Data Repository (60, 1), UDR, configured to:
    split a Data Set (10b), which is provided in the UDR for a plurality of Network Function, NF, service consumers (11), into a plurality of Service Based Architecture, SBA, services (20), wherein each SBA service (20a) is associated with one or more Data Subsets (22a, 23a, 24a, 25a), amongst a plurality of Data Subsets (12) associated with the Data Set (10b), and wherein each SBA service (20a) is provided for one or more NF service consumer (21) amongst the plurality of NF service consumers (11);
    register, toward a Network Repository Function (2), NRF, via a transmitter (640), identifiers for the plurality of SBA services (20a, 20b, 20c) handled at the UDR and an identifier of the UDR;
    receive, from an NF service consumer (3) via receiver (630), a service request for an SBA service (20a); and
    transmit, toward the NF service consumer (3) via the transmitter (640), information data relating to the one or more Data Subsets (22a, 23a, 24a, 25a) associated with the SBA service (20a).

15. A Unified Data Repository (60, 1), UDR, configured to:
    store, for a Data Set (10b) provided in the UDR for a plurality of Network Function, NF, service consumers (11), a plurality of Service Based Architecture, SBA, services (20), wherein each SBA service (20a) is associated with one or more Data Subsets (22a, 23a, 24a, 25a), amongst a plurality of Data Subsets (12) associated with the Data Set (10b), and wherein each SBA service (20a) is provided for one or more NF service consumer (21) amongst the plurality of NF service consumers (11);
    register, toward a Network Repository Function (2), NRF, via a transmitter (640), identifiers for the plurality of SBA services (20a, 20b, 20c) handled at the UDR and an identifier of the UDR;
    receive, from an NF service consumer (3) via receiver (630), a service request for an SBA service (20a); and
    transmit, toward the NF service consumer (3) via the transmitter (640), information data relating to the one or more Data Subsets (22a, 23a, 24a, 25a) associated with the SBA service (20a).

16. The UDR of any one of embodiments 14 or 15, further configured to perform a method according to any one of embodiments 1 to 13.

17. A method for accessing data in a Unified Data Repository (1), UDR, the method carried out at a Network Function, NF, service consumer (70, 3, 4) node and comprising:
    transmitting (S-1310), toward a Network Repository Function (2), NRF, a service discovery request with an identifier of a Service Based Architecture, SBA, service (20a);
    receiving (S-1320), from the NRF (2), an identifier of the UDR (1) instance handling the SBA service (20a);
    transmitting (S-1330), toward the UDR (1) identified by the identifier of the UDR instance, a service request for the SBA service (20a); and
    receiving (S-1340), from the UDR (1), information data relating to the one or more Data Subsets (22a, 23a, 24a, 25a) associated with the SBA service (20a).

18. The method of embodiment 17, further comprising:
    receiving (S-1410), from a further network node (7, 8), an NF service (10a) request for a Data Set (10b) provided in the UDR (1) for a plurality of NF service consumers (11);
    determining (S-1420), based on the further network node (7, 8), an SBA service (20a) for which the service request is transmitted toward the UDR (1); and
    upon receiving (S-1340), from the UDR (1), the information data relating to the one or more Data Subsets (22a, 23a, 24a, 25a) associated with the SBA service (20a), transmitting (S-1430), toward the further network node (7, 8), an NF service (10a) response in accordance with the information data relating to the one or more Data Subsets (22a, 23a, 24a, 25a).

19. A Network Function, NF, service consumer (70, 3, 4) node configured to:
    transmit, toward a Network Repository Function (2), NRF, via transmitter (740), a service discovery request with an identifier of a Service Based Architecture, SBA, service (20a);
    receive, from the NRF (2) via receiver (730), an identifier of the UDR (1) instance handling the SBA service (20a);
    transmit, toward the UDR (1) identified by the identifier of the UDR instance via the transmitter (740), a service request for the SBA service (20a); and
    receive, from the UDR (1) via the receiver (730), information data relating to the one or more Data Subsets (22a, 23a, 24a, 25a) associated with the SBA service (20a).

20. The NF service consumer (70, 4) node of embodiment 19, further configured to:
    receive, from a further network node (7, 8) via the receiver (730), an NF service (10a) request for a Data Set (10b) provided in the UDR (1) for a plurality of NF service consumers (11);
    determine, based on the further network node (7, 8), an SBA service (20a) for which the service request is transmitted toward the UDR (1); and
    upon receiving (S-1340), from the UDR (1), the information data relating to the one or more Data Subsets (22a, 23a, 24a, 25a) associated with the SBA service (20a), transmit, toward the further network node (7, 8) via the transmitter (740), an NF service (10a) response in accordance with the information data relating to the one or more Data Subsets (22a, 23a, 24a, 25a).

21. A computer program (614), comprising instructions which, when executed on at least one processor (620), cause the at least one processor to carry out the method according to any one of embodiments 1 to 13.

22. A computer program (714), comprising instructions which, when executed on at least one processor (720), cause the at least one processor to carry out the method according to any one of embodiments 17 to 18.

23. A computer program product (650, 750) comprising the computer program of embodiment 21 and/or 22.

The invention claimed is:

1. A method for accessing data in a Unified Data Repository (UDR), the method comprising:
   storing, for a Data Set provided in the UDR for a plurality of Network Function (NF) service consumers, a plurality of Service Based Architecture (SBA) services, wherein each of the plurality of SBA services is associated with one or more Data Subsets included in a plurality of Data Subsets associated with the Data Set, and further wherein each of the plurality of SBA services is provided for one or more NF service consumers included in the plurality of NF service consumers;
   registering, from the UDR toward a Network Repository Function (NRF), (i) a plurality of SBA service identifiers identifying the plurality of SBA services handled at the UDR and (ii) an UDR identifier identifying UDR, wherein each of the plurality of SBA service identifiers is different from the UDR identifier and an NF identifier identifying an NF;
   after storing the plurality of SBA services and registering the plurality of SBA service identifiers, receiving, at the NRF from an NF service consumer, a service discovery request with an SBA service identifier identifying a particular SBA service;
   based on receiving the service discovery request with the SBA service identifier identifying the particular SBA service, transmitting, from the NRF toward the NF service consumer, the UDR identifier identifying the UDR handling the particular SBA service identified by the SBA service identifier;
   after receiving the UDR identifier identifying the UDR handling the particular SBA service identified by the SBA service identifier, transmitting, from the NF service consumer toward the UDR identified by the UDR identifier, a service request for the particular SBA service; and
   after transmitting the service request for the particular SBA service, receiving, at the NF service consumer from the UDR, information data relating to the one or more Data Subsets associated with the particular SBA service identified by the SBA service identifier.

2. The method of claim 1, wherein registering the plurality of SBA service identifiers for the plurality of SBA services comprises registering, for each of the plurality of SBA services, identifiers for the associated one or more Data Subsets.

3. The method of claim 1, wherein the Data Set corresponds to a Data Management, DM, NF service.

4. The method of claim 1, wherein the Data Set corresponds to a Subscription Data set.

5. The method of claim 1, wherein
   the particular SBA service corresponds to an Access and Mobility subscription data management, and
   the one or more Data Subsets associated with the particular SBA service comprises any one of: Access and Mobility Subscription data, Slice Selection Subscription data, UE context in Access and Mobility Management Function (AMF) data and AMF registration data.

6. The method of claim 1, wherein
   the particular SBA service corresponds to a Session subscription data management; and
   the one or more Data Subsets associated with the particular SBA service comprises any one of: Session Management Function (SMF) Selection Subscription data, UE context in SMF data, Session Management Subscription data and SMF registration data.

7. The method of claim 1, wherein
   the particular SBA service corresponds to a Short Message Service (SMS) subscription data management; and
   the one or more Data Subsets associated with the particular SBA service comprises any one of: SMS Management Subscription data, SMS Subscription data and SMS Function (SMSF) registration data.

8. The method of claim 1, wherein a different set of values for the one or more Data Subsets, which are associated with each of the plurality of SBA services, is stored per user or user equipment, UE, basis.

9. The method of claim 1, wherein Query, Update, Subscribe, Unsubscribe and Notify operations are defined for each of the plurality of SBA services and usable by one or more NF service consumers for which each of the plurality of SBA services is provided.

10. The method of claim 9, wherein each Query, Update, Subscribe, Unsubscribe and Notify operation is usable by the one or more NF service consumer for which each of the plurality of SBA services is provided per user or UE basis.

11. A Unified Data Repository (UDR) configured to:
    split a Data Set, which is provided in the UDR for a plurality of Network Function (NF) service consumers, into a plurality of Service Based Architecture (SBA) services, wherein each of the plurality of SBA services is associated with one or more Data Subsets included in a plurality of Data Subsets associated with the Data Set, and further wherein each of the plurality of SBA services is provided for one or more NF service consumers included in the plurality of NF service consumers;
    register, toward a Network Repository Function (NRF), via a transmitter, (i) a plurality of SBA service identifiers identifying the plurality of SBA services handled at the UDR and (ii) an UDR identifier identifying the UDR, wherein each of the plurality of SBA service identifiers is different from the UDR identifier and an NF identifier identifying an NF;
    receive, from an NF service consumer via receiver, a service request for a particular SBA service; and
    transmit, toward the NF service consumer via the transmitter, information data relating to the one or more Data Subsets associated with the particular SBA service.

12. The UDR of claim 11, further configured to:
    store, for the Data Set provided in the UDR for the plurality of Network Function (NF) service consumers, the plurality of Service Based Architecture (SBA) services.

13. A method for accessing data in a Unified Data Repository (UDR), the method carried out at a Network Function (NF) service consumer node, the method comprising:
    transmitting, toward a Network Repository Function (NRF), a service discovery request with a Service Based Architecture (SBA) service identifier identifying a particular SBA service;
    after transmitting the service discovery request towards the NRF, receiving, from the NRF, an UDR identifier identifying the UDR handling the particular SBA service identified by the SBA service identifier, wherein the SBA service identifier is different from the UDR identifier and an NF identifier identifying an NF;

after receiving the UDR identifier identifying the UDR handling the particular SBA service, transmitting, toward the UDR identified by the UDR identifier, a service request for the particular SBA service; and after transmitting the service request for the particular SBA service, receiving, from the UDR, information data relating to one or more Data Subsets associated with the particular SBA service.

14. The method of claim 13, further comprising:

receiving, from a further network node, an NF service request for a Data Set provided in the UDR for a plurality of NF service consumers;

determining, based on the further network node, the particular SBA service for which the service request is transmitted toward the UDR; and upon receiving, from the UDR, the information data relating to the one or more Data Subsets associated with the particular SBA service, transmitting, toward the further network node, an NF service response in accordance with the information data relating to the one or more Data Subsets associated with the particular SBA service.

15. A Network Function (NF) service consumer node comprising:

at least one processor;

at least one memory;

a transmitter; and a receiver, wherein the NF service consumer node is configured to:

transmit, toward a Network Repository Function (NRF), via the transmitter, a service discovery request with a Service Based Architecture (SBA) service identifier identifying a particular SBA service;

after transmitting the service discovery request towards the NRF, receive, from the NRF via the receiver, a Unified Data Repository (UDR) identifier identifying an UDR handling the particular SBA service identified by the SBA service identifier;

after receiving the UDR identifier identifying the UDR handling the particular SBA service, transmit, toward the UDR identified by the UDR identifier via the transmitter, a service request for the particular SBA service identified by the SBA service identifier, wherein the SBA service identifier is different from the UDR identifier and an NF identifier identifying an NF; and after transmitting the service request for the particular SBA service, receive, from the UDR via the receiver, information data relating to one or more Data Subsets associated with the particular SBA service.

16. The NF service consumer node of claim 15, further configured to:

receive, from a further network node via the receiver, an NF service request for a Data Set provided in the UDR for a plurality of NF service consumers;

determine, based on the further network node, the particular SBA service for which the service request is transmitted toward the UDR; and upon receiving, from the UDR, the information data relating to the one or more Data Subsets associated with the particular SBA service, transmit, toward the further network node via the transmitter, an NF service response in accordance with the information data relating to the one or more Data Subsets associated with the particular SBA service.

* * * * *